United States Patent
Sahraei et al.

(10) Patent No.: US 12,009,894 B2
(45) Date of Patent: Jun. 11, 2024

(54) ESTIMATION OF CHANNEL STATE INFORMATION FOR NON-SOUNDED PANELS OR SUBPANELS BASED ON SOUNDED PANELS OR SUBPANELS

(71) Applicant: QUALCOMM Incorporated, San Diego, CA (US)

(72) Inventors: Saeid Sahraei, San Diego, CA (US); Muhammad Sayed Khairy Abdelghaffar, San Jose, CA (US); Renqiu Wang, San Diego, CA (US); Lu Yuan, San Diego, CA (US); Joseph Patrick Burke, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/652,804

(22) Filed: Feb. 28, 2022

(65) Prior Publication Data
US 2023/0275635 A1   Aug. 31, 2023

(51) Int. Cl.
*H04L 25/02* (2006.01)
*H04B 7/0426* (2017.01)
*H04B 7/06* (2006.01)

(52) U.S. Cl.
CPC ........... *H04B 7/0626* (2013.01); *H04B 7/043* (2013.01); *H04B 7/0695* (2013.01); *H04L 25/0224* (2013.01)

(58) Field of Classification Search
CPC .... H04B 7/0626; H04B 7/043; H04B 7/0695; H04B 7/0658; H04L 25/0224
See application file for complete search history.

(56) References Cited

U.S. PATENT DOCUMENTS

2022/0279535 A1\*  9/2022  Tsui .................. H04L 41/16

FOREIGN PATENT DOCUMENTS

EP   3035620 A1   6/2016

OTHER PUBLICATIONS

Partial International Search Report—PCT/US2023/060299—ISA/EPO—Apr. 3, 2023.
International Search Report and Written Opinion—PCT/US2023/060299—ISA/EPO—Jun. 1, 2023.

\* cited by examiner

*Primary Examiner* — Hashim S Bhatti
(74) *Attorney, Agent, or Firm* — Harrity & Harrity LLP / Qualcomm

(57) ABSTRACT

Various aspects of the present disclosure generally relate to wireless communication. In some aspects, a network entity may receive a sounding reference signal (SRS) at a multi-panel system of the network entity, where the multi-panel system includes one or more sounded panels and one or more non-sounded panels. The network entity may estimate a channel to obtain channel state information (CSI) for the one or more sounded panels based at least in part on the SRS. The network entity may estimate CSI for the one or more non-sounded panels based at least in part on the CSI for the one or more sounded panels. The network entity may transmit or receive a communication based at least in part on the CSI for the one or more sounded panels and the CSI for the one or more non-sounded panels. Numerous other aspects are described.

30 Claims, 19 Drawing Sheets

ESTIMATION OF CHANNEL STATE INFORMATION FOR NON-SOUNDED PANELS OR SUBPANELS BASED ON SOUNDED PANELS OR SUBPANELS

FIELD OF THE DISCLOSURE

Aspects of the present disclosure generally relate to wireless communication and to techniques and apparatuses for estimating channel state information (CSI) for non-sounding panels or subpanels based on CSI sounded panels or subpanels.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network entity. The method may include receiving a sounding reference signal (SRS) at a multi-panel system of the network entity, where the multi-panel system includes one or more sounded panels and one or more non-sounded panels. The method may include estimating a channel to obtain channel state information (CSI) for the one or more sounded panels based at least in part on the SRS. The method may include estimating CSI for the one or more non-sounded panels based at least in part on the CSI for the one or more sounded panels. The method may include transmitting or receiving a communication based at least in part on the CSI for the one or more sounded panels and the CSI for the one or more non-sounded panels.

Some aspects described herein relate to a method of wireless communication performed by a network entity. The method may include receiving an SRS at a panel of a multi-panel system of the network entity, where the panel includes one or more sounded subpanels and one or more non-sounded subpanels. The method may include estimating a channel to obtain CSI for the one or more sounded subpanels based at least in part on the SRS. The method may include estimating CSI for the one or more non-sounded subpanels of the panel based at least in part on the CSI for the one or more sounded subpanels. The method may include transmitting or receiving a communication based at least in part on the CSI for the one or more sounded subpanels and the CSI for the one or more non-sounded subpanels.

Some aspects described herein relate to a method of wireless communication performed by a network entity. The method may include receiving an SRS at a multi-panel system of the network entity. The method may include estimating a channel for the multi-panel system using intra-panel subsampling or inter-panel subsampling. The method may include transmitting or receiving a communication based at least in part on the estimating the channel.

Some aspects described herein relate to a network entity for wireless communication. The network entity may include a memory and one or more processors coupled to the memory. The one or more processors may be configured to receive an SRS at a multi-panel system of the network entity, where the multi-panel system includes one or more sounded panels and one or more non-sounded panels. The one or more processors may be configured to estimate a channel to obtain CSI for the one or more sounded panels based at least in part on the SRS. The one or more processors may be configured to estimate CSI for the one or more non-sounded panels based at least in part on the CSI for the one or more sounded panels. The one or more processors may be configured to transmit or receive a communication based at least in part on the CSI for the one or more sounded panels and the CSI for the one or more non-sounded panels.

Some aspects described herein relate to a network entity for wireless communication. The network entity may include a memory and one or more processors coupled to the memory. The one or more processors may be configured to receive an SRS at a panel of a multi-panel system of the network entity, where the panel includes one or more sounded subpanels and one or more non-sounded subpanels. The one or more processors may be configured to estimate a channel to obtain CSI for the one or more sounded subpanels based at least in part on the SRS. The one or more processors may be configured to estimate CSI for the one or more non-sounded subpanels of the panel based at least in part on the CSI for the one or more sounded subpanels. The one or more processors may be configured to transmit or receive a communication based at least in part on the CSI for the one or more sounded subpanels and the CSI for the one or more non-sounded subpanels.

Some aspects described herein relate to a network entity for wireless communication. The network entity may include a memory and one or more processors coupled to the memory. The one or more processors may be configured to receive an SRS at a multi-panel system of the network entity. The one or more processors may be configured to estimate a channel for the multi-panel system using intra-panel subsampling or inter-panel subsampling. The one or more processors may be configured to transmit or receive a communication based at least in part on the estimating the channel.

Some aspects described herein relate to a non-transitory computer-readable medium that stores a set of instructions for wireless communication by a network entity. The set of instructions, when executed by one or more processors of the network entity, may cause the network entity to receive an SRS at a multi-panel system of the network entity, where the multi-panel system includes one or more sounded panels and one or more non-sounded panels. The set of instructions, when executed by one or more processors of the network entity, may cause the network entity to estimate a channel to obtain CSI for the one or more sounded panels based at least in part on the SRS. The set of instructions, when executed by one or more processors of the network entity, may cause the network entity to estimate CSI for the one or more non-sounded panels based at least in part on the CSI for the one or more sounded panels. The set of instructions, when executed by one or more processors of the network entity, may cause the network entity to transmit or receive a communication based at least in part on the CSI for the one or more sounded panels and the CSI for the one or more non-sounded panels.

Some aspects described herein relate to a non-transitory computer-readable medium that stores a set of instructions for wireless communication by a network entity. The set of instructions, when executed by one or more processors of the network entity, may cause the network entity to receive an SRS at a panel of a multi-panel system of the network entity, where the panel includes one or more sounded subpanels and one or more non-sounded subpanels. The set of instructions, when executed by one or more processors of the network entity, may cause the network entity to estimate a channel to obtain CSI for the one or more sounded subpanels based at least in part on the SRS. The set of instructions, when executed by one or more processors of the network entity, may cause the network entity to estimate CSI for the one or more non-sounded subpanels of the panel based at least in part on the CSI for the one or more sounded subpanels. The set of instructions, when executed by one or more processors of the network entity, may cause the network entity to transmit or receive a communication based at least in part on the CSI for the one or more sounded subpanels and the CSI for the one or more non-sounded subpanels.

Some aspects described herein relate to a non-transitory computer-readable medium that stores a set of instructions for wireless communication by a network entity. The set of instructions, when executed by one or more processors of the network entity, may cause the network entity to receive an SRS at a multi-panel system of the network entity. The set of instructions, when executed by one or more processors of the network entity, may cause the network entity to estimate a channel for the multi-panel system using intra-panel subsampling or inter-panel subsampling. The set of instructions, when executed by one or more processors of the network entity, may cause the network entity to transmit or receive a communication based at least in part on the estimating the channel.

Some aspects described herein relate to an apparatus for wireless communication. The apparatus may include means for receiving an SRS at a multi-panel system of the network entity, where the multi-panel system includes one or more sounded panels and one or more non-sounded panels. The apparatus may include means for estimating a channel to obtain CSI for the one or more sounded panels based at least in part on the SRS. The apparatus may include means for estimating CSI for the one or more non-sounded panels based at least in part on the CSI for the one or more sounded panels. The apparatus may include means for transmitting or receiving a communication based at least in part on the CSI for the one or more sounded panels and the CSI for the one or more non-sounded panels.

Some aspects described herein relate to an apparatus for wireless communication. The apparatus may include means for receiving an SRS at a panel of a multi-panel system of the network entity, where the panel includes one or more sounded subpanels and one or more non-sounded subpanels. The apparatus may include means for estimating a channel to obtain CSI for the one or more sounded subpanels based at least in part on the SRS. The apparatus may include means for estimating CSI for the one or more non-sounded subpanels of the panel based at least in part on the CSI for the one or more sounded subpanels. The apparatus may include means for transmitting or receiving a communication based at least in part on the CSI for the one or more sounded subpanels and the CSI for the one or more non-sounded subpanels.

Some aspects described herein relate to an apparatus for wireless communication. The apparatus may include means for receiving an SRS at a multi-panel system of the network entity. The apparatus may include means for estimating a channel for the multi-panel system using intra-panel subsampling or inter-panel subsampling. The apparatus may include means for transmitting or receiving a communication based at least in part on the estimating the channel.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
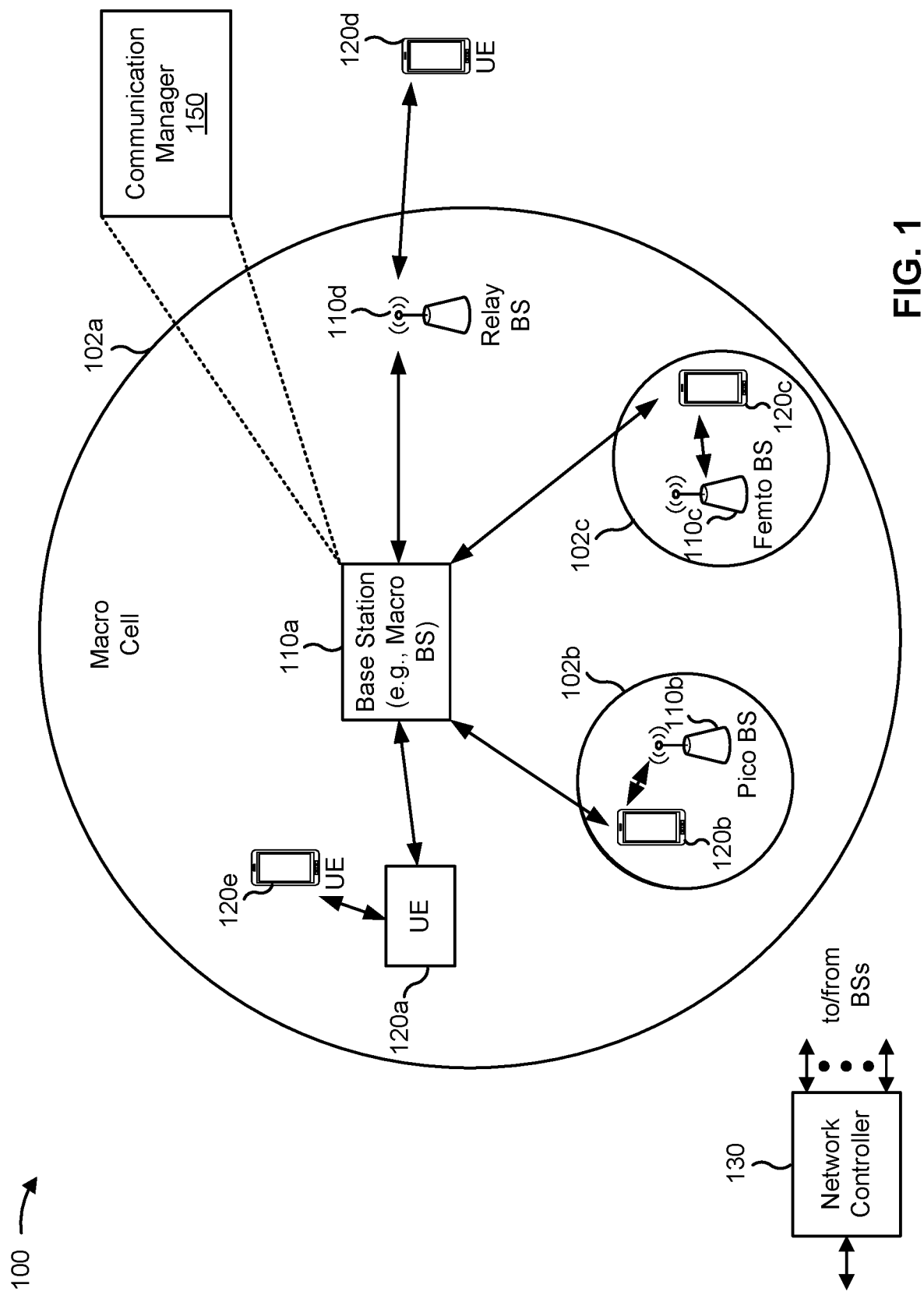
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network entity may include a communication manager 150. As described in more detail elsewhere herein, the communication manager 150 may receive a sounding reference signal (SRS) at a multi-panel system of the network entity, where the multi-panel system includes one or more sounded panels and one or more non-sounded panels. The communication manager 150 may estimate a channel to obtain channel state information (CSI) for the one or more sounded panels based at least in part on the SRS and estimate CSI for the one or more non-sounded panels based at least in part on the CSI for the one or more sounded panels. The communication manager 150 may transmit or receive a communication based at least in part on the CSI for the one or more sounded panels and the CSI for the one or more non-sounded panels.

In some aspects, the communication manager 150 may receive an SRS at a panel of a multi-panel system of the network entity, where the panel includes one or more sounded subpanels and one or more non-sounded subpanels. The communication manager 150 may estimate a channel to obtain CSI for the one or more sounded subpanels based at least in part on the SRS and estimate CSI for the one or more non-sounded subpanels of the panel based at least in part on the CSI for the one or more sounded subpanels. The communication manager 150 may transmit or receive a communication based at least in part on the CSI for the one or more sounded subpanels and the CSI for the one or more non-sounded subpanels.

In some aspects, the communication manager 150 may receive an SRS at a multi-panel system of the network entity and estimate a channel for the multi-panel system using intra-panel subsampling or inter-panel subsampling. The communication manager 150 may transmit or receive a communication based at least in part on the estimating the channel. Additionally, or alternatively, the communication manager 150 may perform one or more other operations described herein.

As indicated above, FIG. 1 is provided as an example. Other examples may differ from what is described with regard to FIG. 1.

Figure 2:
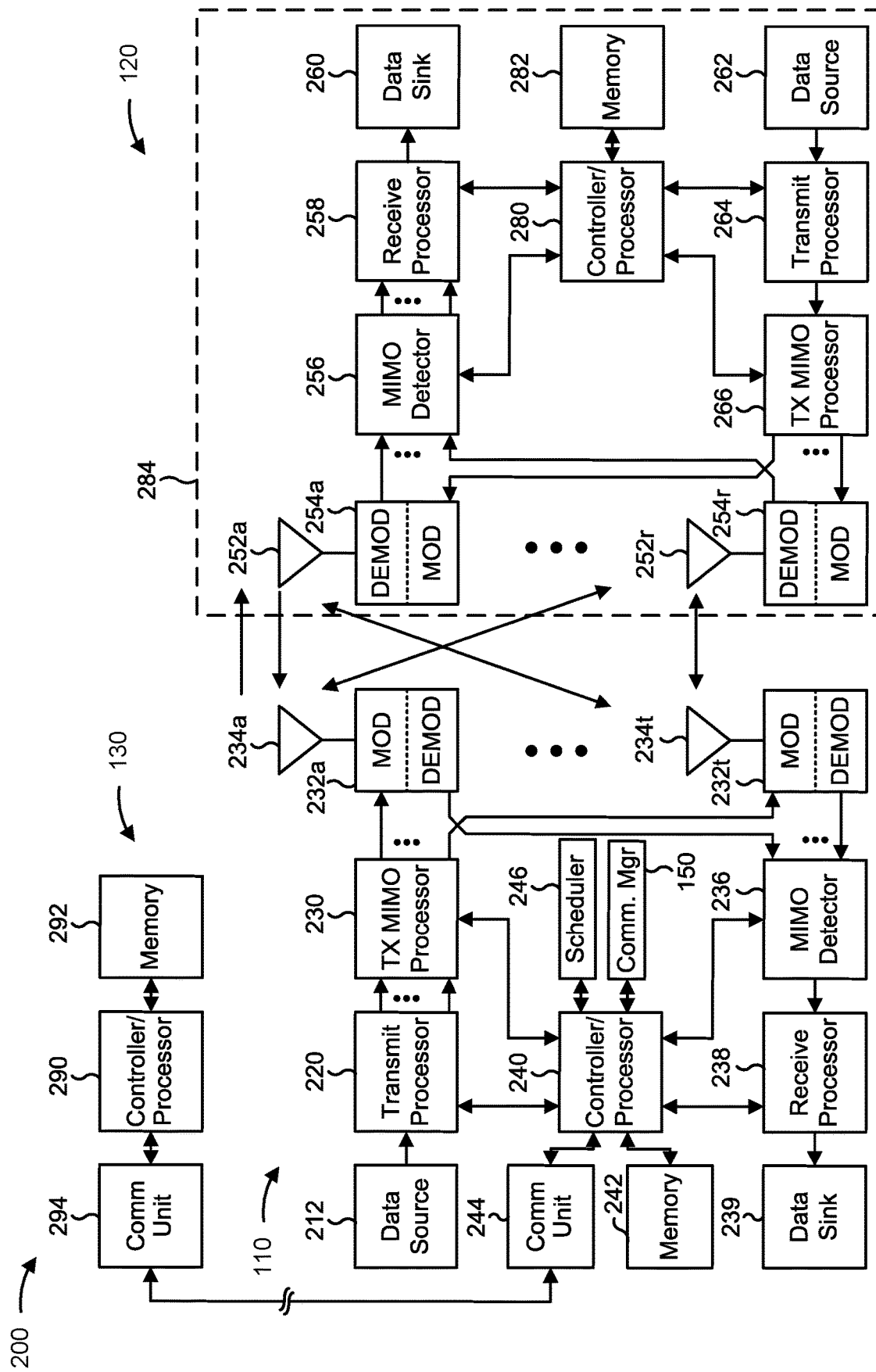
FIG. 2 is a diagram illustrating an example of a base station in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-19).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120.

The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-19).

The controller/processor 240 of a network entity (e.g., the controller/processor 240 of the base station 110), the controller/processor 280 of the UE 120, and/or any other component(s) of FIG. 2 may perform one or more techniques associated with, as described in more detail elsewhere herein. For example, the controller/processor 240 of the base station 110, the controller/processor 280 of the UE 120, and/or any other component(s) of FIG. 2 may perform or direct operations of, for example, process 1600 of FIG. 16, process 1700 of FIG. 17, process 1800 of FIG. 18, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1600 of FIG. 16, process 1700 of FIG. 17, process 1800 of FIG. 18, and/or other processes as described herein. In some examples, executing instructions may include running the instructions, converting the instructions, compiling the instructions, and/or interpreting the instructions, among other examples.

In some aspects, the network entity includes means for receiving an SRS at a multi-panel system of the network entity, where the multi-panel system includes one or more sounded panels and one or more non-sounded panels; means for estimating a channel to obtain CSI for the one or more sounded panels based at least in part on the SRS; means for estimating CSI for the one or more non-sounded panels based at least in part on the CSI for the one or more sounded panels; and/or means for transmitting or receiving a communication based at least in part on the CSI for the one or more sounded panels and the CSI for the one or more non-sounded panels. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network entity includes means for receiving an SRS at a panel of a multi-panel system of the network entity, where the panel includes one or more sounded subpanels and one or more non-sounded subpanels;

means for estimating a channel to obtain CSI for the one or more sounded subpanels based at least in part on the SRS; means for estimating CSI for the one or more non-sounded subpanels of the panel based at least in part on the CSI for the one or more sounded subpanels; and/or means for transmitting or receiving a communication based at least in part on the CSI for the one or more sounded subpanels and the CSI for the one or more non-sounded subpanels.

In some aspects, the network entity includes means for receiving an SRS at a multi-panel system of the network entity; means for estimating a channel for the multi-panel system using intra-panel subsampling or inter-panel subsampling; and/or means for transmitting or receiving a communication based at least in part on the estimating the channel.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
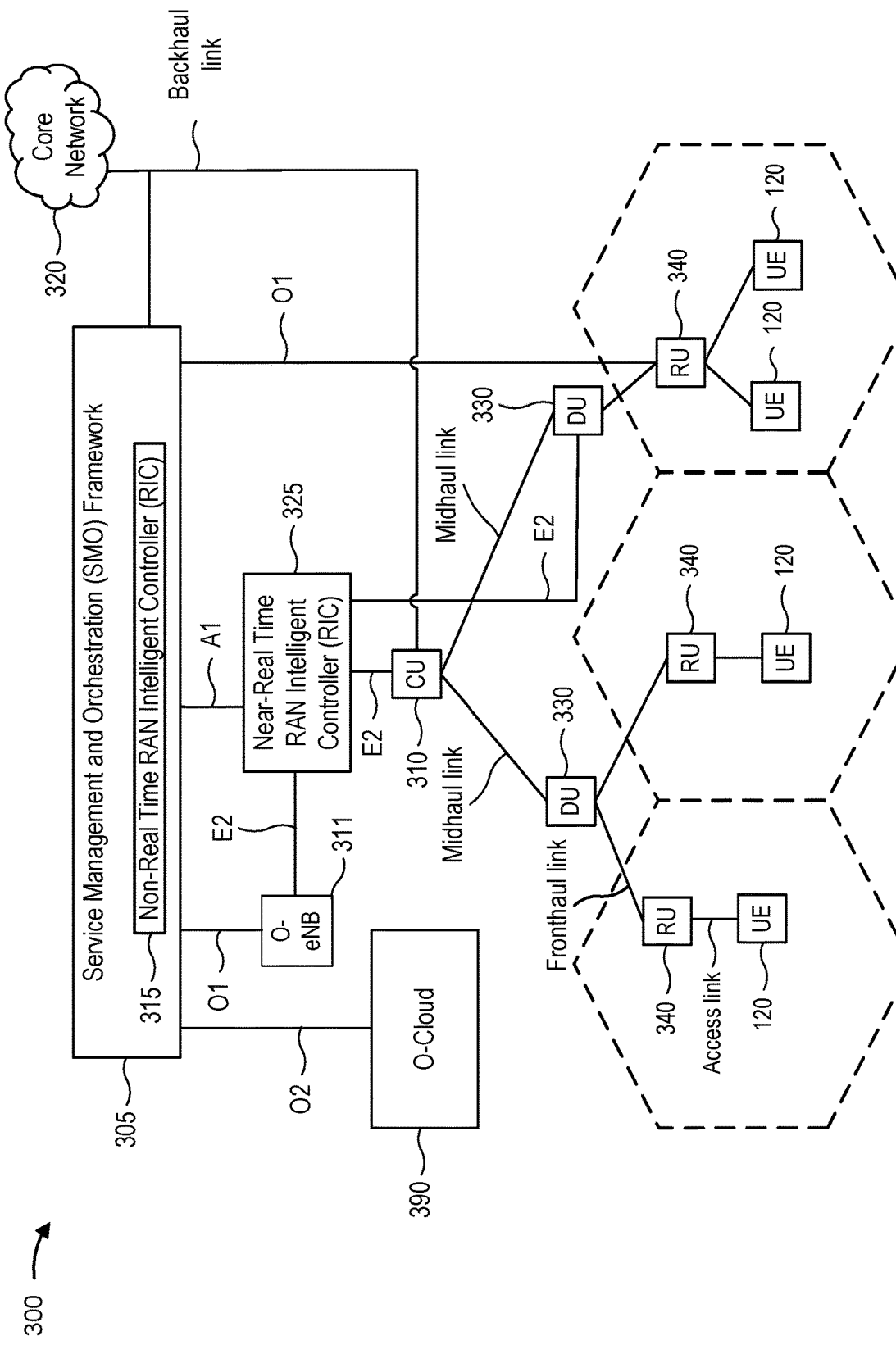
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more radio frequency (RF) access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
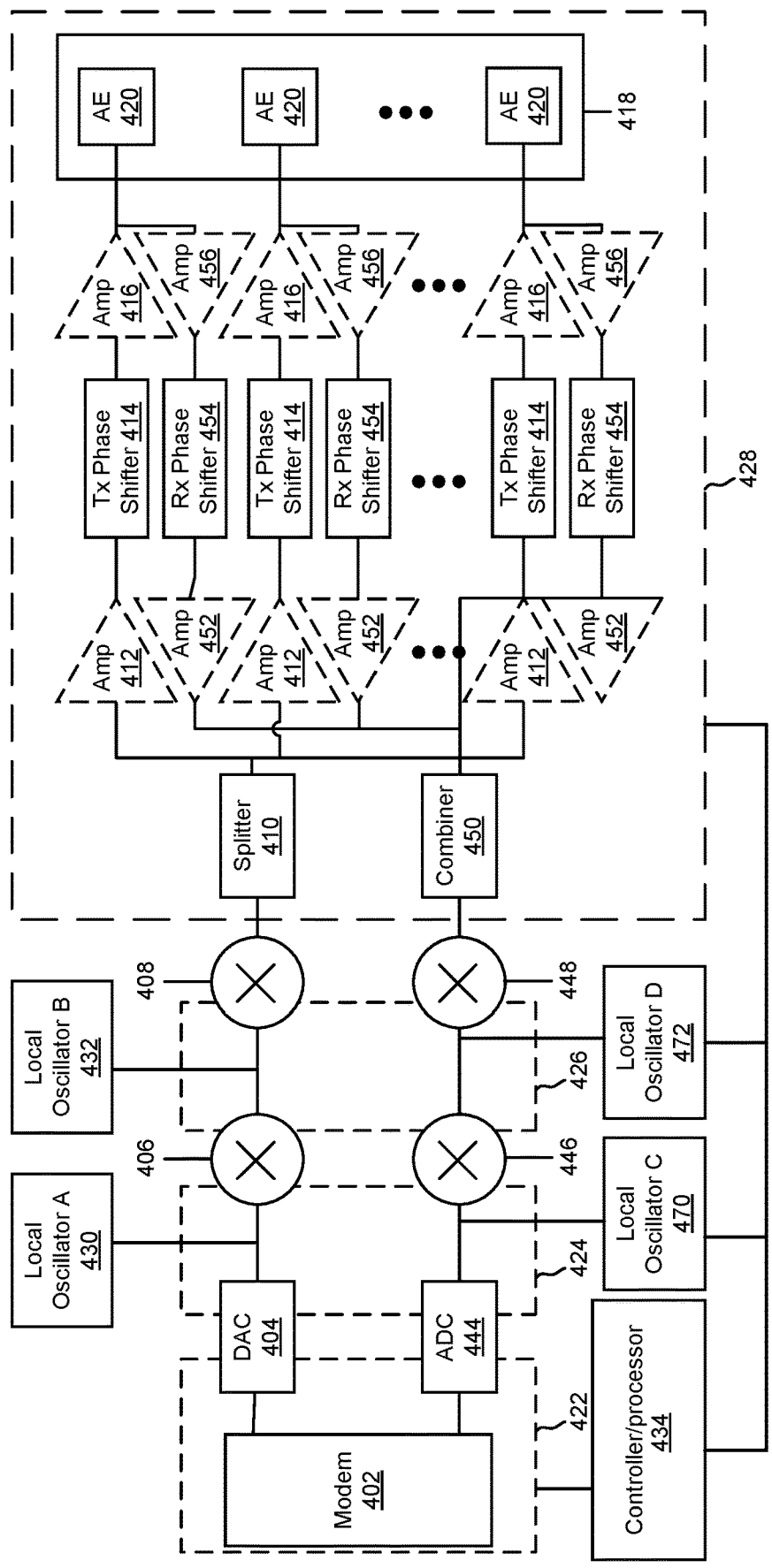
FIG. 4 is a diagram illustrating an example beamforming architecture that supports beamforming for millimeter wave communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE, or base station) and/or a receiving device (e.g., a second wireless communication device, UE, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the base station described above in connection with FIG. 2 and/or controller/processor 280 of the UE described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

A network entity may have two or more panels for simultaneous transmission and reception with improved isolation. Each panel may have, for example, 256 antenna elements mapped to 64 transceiver units (TxRus). The panels may use a hybrid beamforming technology that is backward compatible with legacy TDD.

As indicated above, FIG. 4 is provided as an example. Other examples may differ from what is described with regard to FIG. 4.

Figure 5:
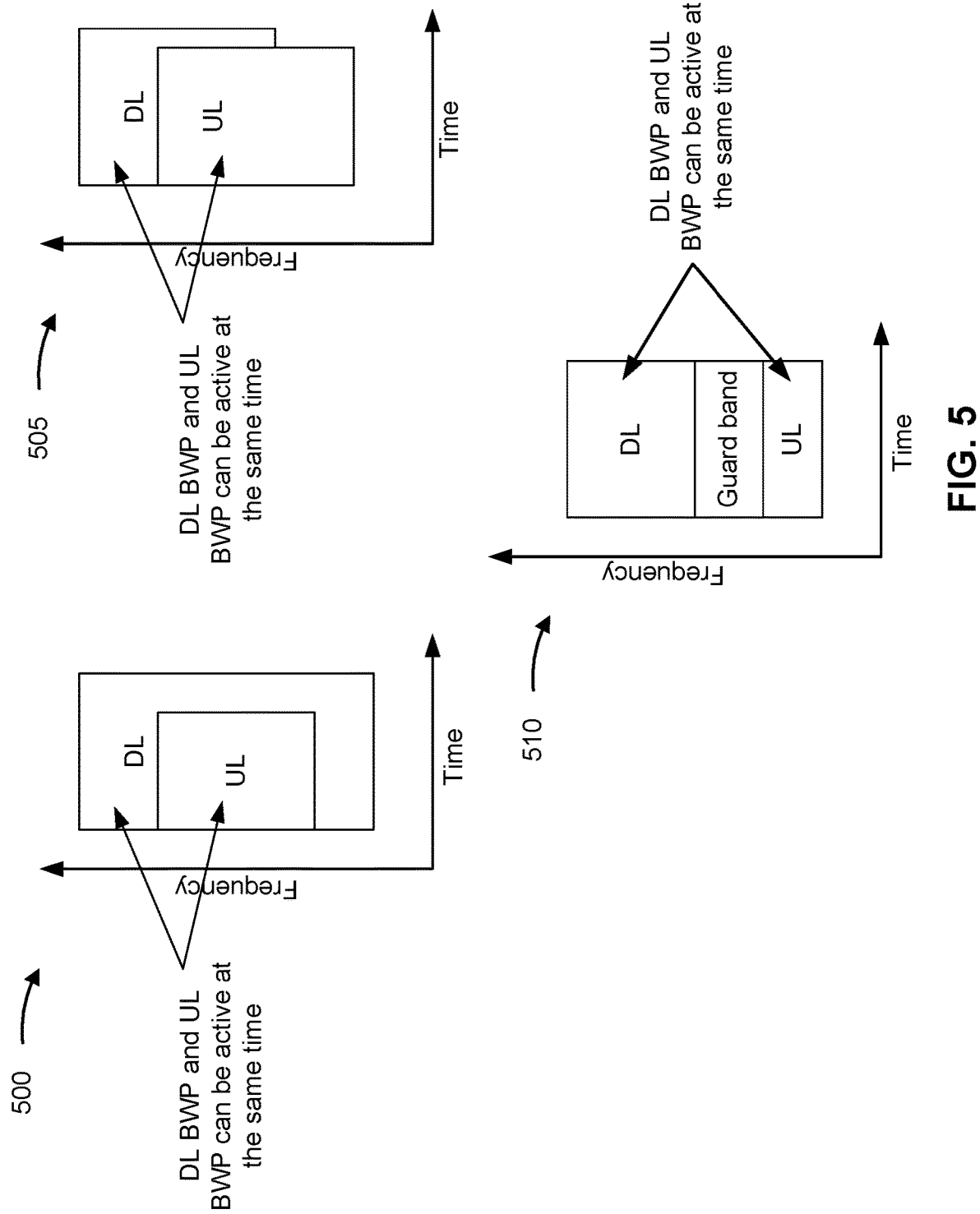
FIG. 5 is a diagram illustrating examples of full-duplex communication in a wireless network, in accordance with the present disclosure.

FIG. 5 is a diagram illustrating examples 500, 505, and 510 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 5, examples 500 and 505 show examples of in-band full-duplex (IBFD) communication. In IBFD, a UE may transmit an uplink communication to a base station and receive a downlink communication from the network entity on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, example 510 shows an example of sub-band full-duplex (SBFD) communication, which may also be referred to as "sub-band frequency division duplex (SBFDD)" or "flexible duplex." In SBFD, a UE may transmit an uplink communication to a network entity and receive a downlink communication from the network entity at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band. SBFD may help to enhance latency and uplink coverage via frequency division duplexing (FDD) in TDD bands. SBFD is simple to enable and may be suitable for macro cells with a large transmit power.

As indicated above, FIG. 5 is provided as an example. Other examples may differ from what is described with respect to FIG. 5.

Figure 6:
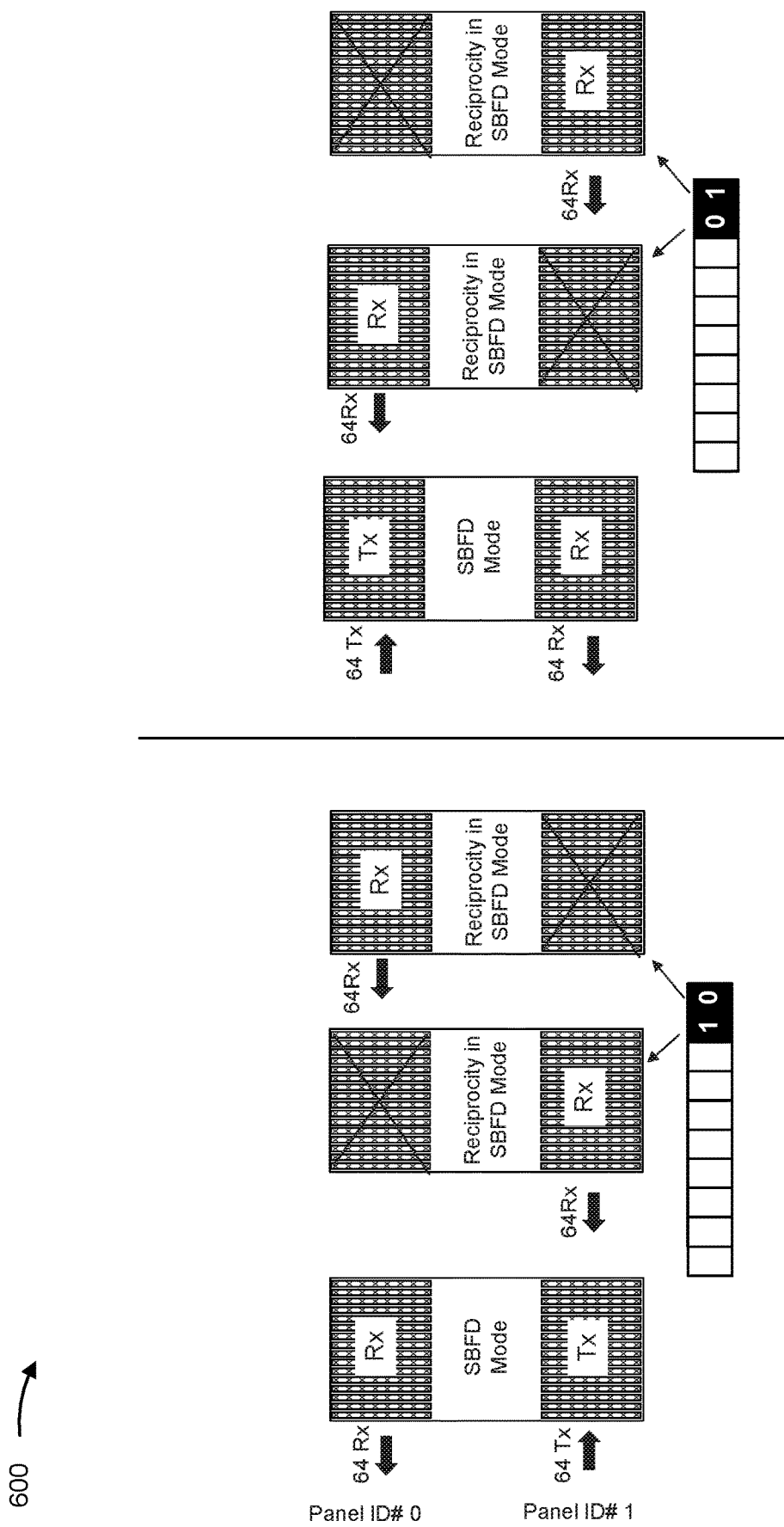
FIG. 6 is a diagram illustrating an example of obtaining channel state information, in accordance with the present disclosure.

FIG. 6 is a diagram illustrating an example 600 of obtaining CSI, in accordance with the present disclosure.

A UE may transmit an SRS, which is a reference signal used for sounding. A network entity may receive the SRS on a channel and estimate the channel using the SRS. The network entity may estimate the channel by estimating the time-varying channel frequency response for the signal over OFDM symbols. The estimate may be a channel matrix that is associated with how data streams travel on the channel. The network entity may generate information, or CSI, that describes how well the signal propagates from the UE to the network entity and represents the combined effect of, for example, scattering, fading, and power decay with distance. The CSI may indicate properties of the channel and may be used to improve system performance.

A network entity may use SBFD to obtain CSI for uplink reception and downlink transmission. Uplink reception may involve uplink combining, and downlink transmission may involve downlink beamforming (reciprocity). While the network entity may simultaneously transmit and receive in an SBFD mode, each panel may be sounded separately. The values of "1" and "0" refer to SRS sounding to panel identifier (ID) 0 or 1. The network entity may sound individual panels.

The SRS may be received over one or more symbols. A separate SRS symbol for receive-only mode may be used for a better quality of channel estimation (uplink CSI acquisition for uplink combining) and also to obtain the SRS for the whole frequency band instead of using a narrower band during SBFD.

For TDD, both panels are used for either transmission or reception. For reception mode, 64 receive paths may be used by combining the received signal from each panel. For transmission mode, 64 transmit paths may be used by splitting the transmitted signal into both panels. There may be no need for panel IDs if both panels have the same direction in each symbol.

As indicated above, FIG. 6 is provided as an example. Other examples may differ from what is described with regard to FIG. 6.

Figure 7:
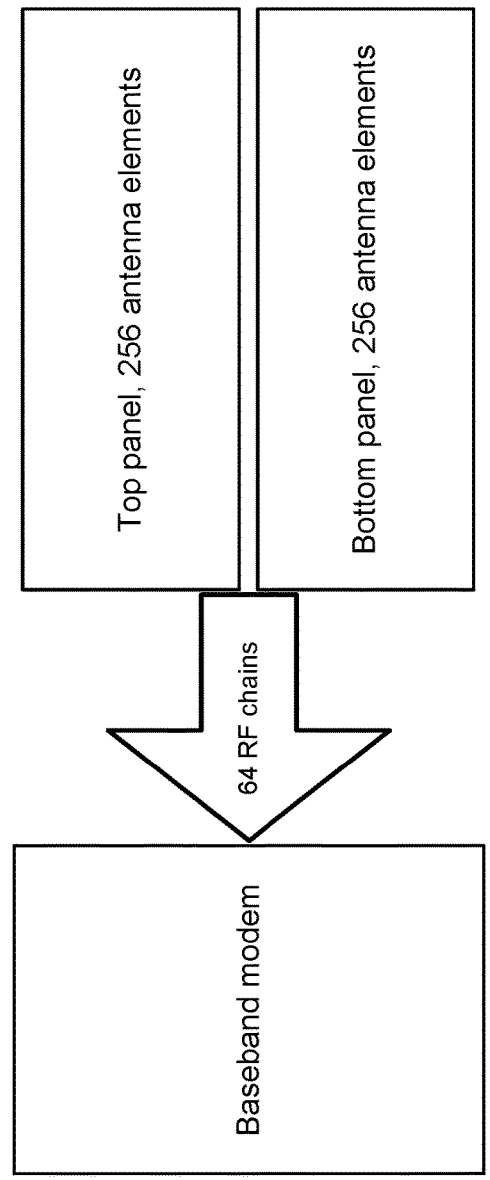
FIG. 7 is a diagram illustrating an example of antenna elements connected to radio frequency chains, in accordance with the present disclosure.

FIG. 7 is a diagram illustrating an example 700 of antenna elements connected to RF chains, in accordance with the present disclosure.

With 64 RF chains, the number of 4:1 subarrays that can be connected to the baseband modem is 64 for 256 antenna elements. This poses a limitation for full-panel SRS sounding, as half of the 4:1 subarrays (subpanels) will not be received. The UE will have to transmit an SRS twice, once for each half panel. This consumes additional signaling resources.

As indicated above, FIG. 7 is provided as an example. Other examples may differ from what is described with regard to FIG. 7.

Figure 8:
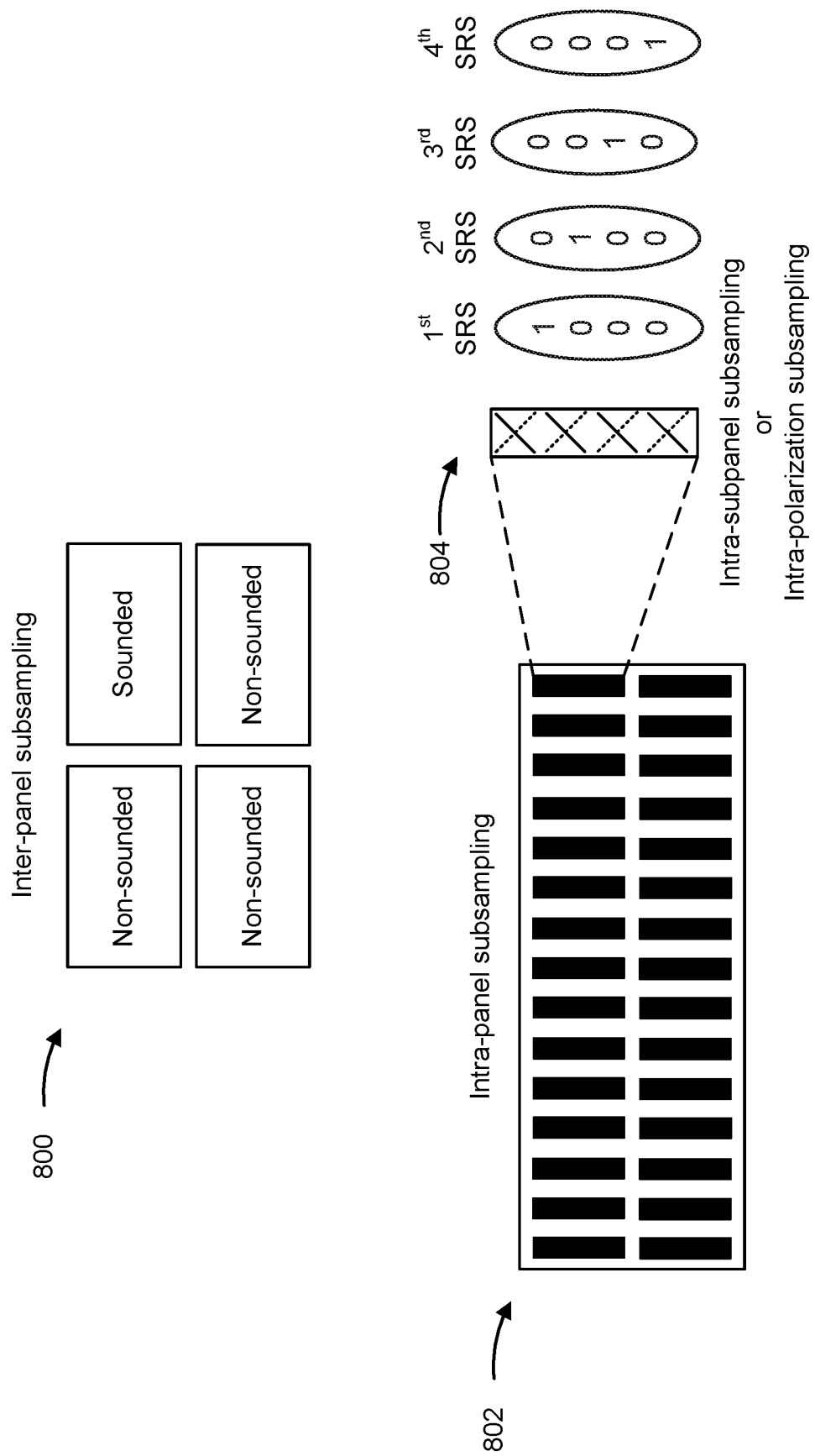
FIG. 8 is a diagram illustrating an examples of channel estimation subsampling, in accordance with the present disclosure.

FIG. 8 is a diagram illustrating an examples of channel estimation subsampling, in accordance with the present disclosure.

According to various aspects described herein, a network entity with a multi-panel system may use subsampling to obtain CSI when receiving an SRS to estimate a channel for the panels and subpanels of the multi-panel system. Subsampling may include using the SRS to estimate the channel for a proper subset of panels (or subpanels in a panel) rather than for all of the panels or for all of the subpanels in a panel. Subsampling may include estimating the CSI for the remaining panels or subpanels by extrapolating the CSI that was obtained using the SRS.

As shown by reference number 800, the network entity may use inter-panel subsampling to obtain CSI, where one or more panels of the multi-panel system are sounded. Sounded panels are panels for which the network entity uses an SRS to estimate the channel. One or more panels of the multi-panel system are non-sounded. Non-sounded panels do not use an SRS to estimate the channel. The non-sounded panels may receive the SRS, but the SRS samples are not forwarded to the baseband processing unit, due to a lack of an interface. Rather, the network entity may use the CSI for the sounded panels to obtain CSI for the non-sounded panels (e.g., by interpolation or extrapolation of CSI values for the sounded panels). This may include, for example, assigning weights to the non-sounded panels or averaging CSI values of the sounded panels and taking the averaged CSI values to be CSI for the non-sounded panels.

In some aspects, as shown by reference number 802, the network entity may use intra-panel subsampling to obtain CSI for subpanels of a panel of the multi-panel system. For example, a panel may have one or more sounded subpanels and one or more non-sounded subpanels. The network entity may use an SRS to estimate the channel for sounded subpanels and use CSI for the sounded subpanels to obtain CSI for the non-sounded subpanels.

The number of antenna elements may be larger than the number of RF/digital chains (transceiver units), and each of M antenna elements may be operated by a single transceiver unit. In some aspects, as shown by reference number 804, the network entity may use intra-subpanel subsampling. For example, a subpanel may have one or more sounded antenna elements (where the network entity uses an SRS to estimate the channel and obtain CSI) and one or more non-sounded antenna elements (where the network entity uses the CSI of sounded antenna elements to obtain CSI of non-sounded antenna elements).

In some scenarios (e.g., hybrid beamforming), it may be required to get a per-antenna element channel. The network entity may cycle through antenna elements for an SRS at each sounding occasion. M sounding occasions may be needed to estimate the channel for each of the M antenna elements in a subpanel. A spatial correlation for a subpanel may include the correlation between a signal's spatial direction and the average received signal gain. The network entity may estimate the channel for antenna elements that are not sounded based at least in part on spatial interpolation, which uses a spatial correlation between antenna elements to estimate the channel for other antenna elements. For example, a first antenna element is sounded (second through fourth antenna elements are non-sounded) for a first SRS, the second antenna element is sounded (first, third, and fourth antenna elements are not) for a second SRS, the third antenna element is sounded (first, second, and fourth antenna elements are not) for a third SRS, and the fourth antenna element is sounded (first, second, and third antenna elements are not) for a fourth SRS.

A network entity may transmit and receive with beams that have a polarization. Linear polarization occurs when the tip of the electric field of an electromagnetic wave at a fixed point in space oscillates along a straight line over time. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference. A circular polarization may be a right-hand circular polarization (RHCP) or a left-hand circular polarization (LHCP). In some aspects, the network entity may use intra-polarization sub-sampling, where one or more sounded antenna elements of a first polarization (e.g., horizontal polarization in a sub-panel) use an SRS to estimate the channel to obtain CSI and one or more non-sounded antenna elements of the first polarization use the CSI of the sounded antenna elements of the first polarization to obtain CSI for the non-sounded antenna elements of the first polarization. One or more sounded antenna elements of a second polarization (e.g., linear polarization in the subpanel) use an SRS to estimate the channel to obtain CSI and one or more non-sounded antenna elements of the second polarization use the CSI of the sounded antenna elements of the second polarization to obtain CSI for the non-sounded antenna elements of the second polarization.

By using subsampling on a panel, subpanel, or antenna element basis to estimate a channel, the network entity may accurately estimate the channel with fewer SRSs. This may be applicable to multi-panels systems where there are a limited number of RF chains with respect to the antenna elements of the panels. As a result of using fewer SRSs, the network entity may reduce latency and conserve signaling resources.

As indicated above, FIG. 8 is provided as an example. Other examples may differ from what is described with respect to FIG. 8.

Figure 9:
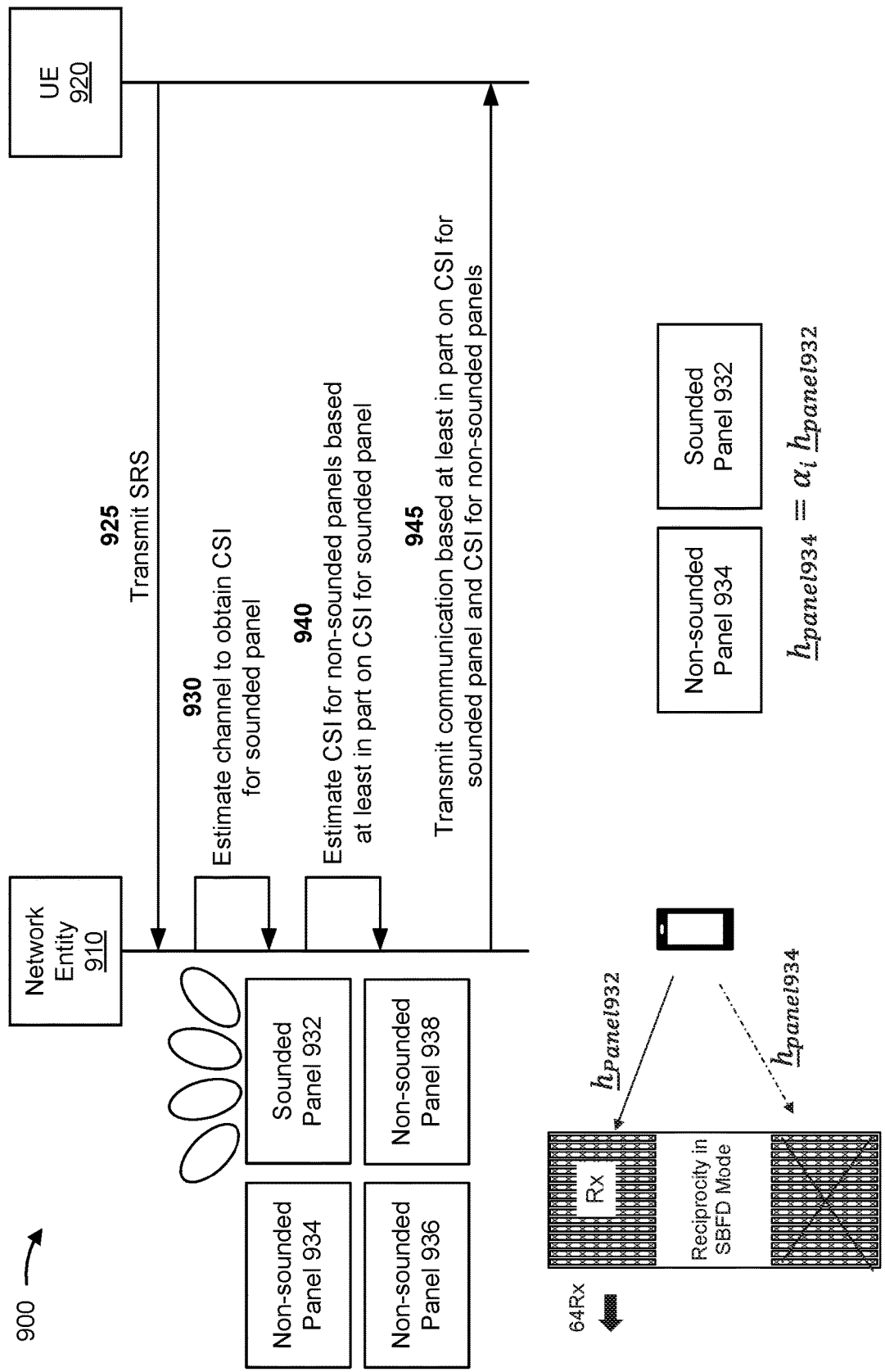
FIG. 9 is a diagram illustrating an example of a multi-panel system using inter-panel subsampling to estimate a channel, in accordance with the present disclosure.

FIG. 9 is a diagram illustrating an example 900 of a multi-panel system using inter-panel subsampling to estimate a channel, in accordance with the present disclosure. As shown in FIG. 9, a network entity 910 (e.g., base station 110) and a UE 920 (e.g., a UE 120) may communicate with one another.

As shown by reference number 925, the UE 920 may transmit an SRS on a channel. The network entity 910 may estimate the channel based at least in part on the SRS. For example, as shown by reference number 930, the network entity 910 may use the SRS to estimate the channel and obtain CSI for a sounded panel 932 of the multi-panel system. The multi-panel system may include non-sounded panels 934, 936, and 938, which do not use the SRS to estimate the channel. The spatial correlation of the channel may depend on a beam direction. The network entity 910 may use a training procedure (e.g., calibration) to estimate the spatial correlation between the panel, subpanels, or antenna elements for each frequency band.

As shown by reference number 940, the network entity 910 may estimate CSI for the non-sounded panels 934, 936, and 938 based at least in part on the CSI for the sounded panel 932. The sounded panel 932 may be connected to a transceiver unit. The network entity 910 may estimate the channel of a non-sounded panel by exploiting the spatial correlation between panels. The spatial (beam) correlation may depend on the frequency band. In some aspects, the network entity 910 may interpolate (e.g., determine, estimate) a CSI value of the sounded panel 932 for each non-sounded panel to obtain a CSI value for each non-sounded panel. For example, the network entity 910 may apply an interpolation coefficient (e.g., a weight) a to a CSI value of the sounded panel 932 for each non-sounded panel to obtain a CSI value for each non-sounded panel. For example, $h_{panel934} = \alpha_i h_{panel932}$, where $\alpha_i$ is a matrix where each element represents the spatial correlation between two antenna elements of each panel for beam i. For a full duplex multi-panel system with two panels having a relatively small separation between each panel, the channels may be highly correlated. The network entity 910 may apply a greater interpolation coefficient to a sounded panel closer to the non-sounded panel and a lesser interpolation coefficient to a sounded panel further away from the non-sounded panel.

In some aspects, the network entity 910 may perform a beam sweep to calculate interpolation coefficients. For example, the network entity 910 may select or calculate one or more interpolation coefficients for each beam direction of a beam sweep. The network entity 910 may select interpolation coefficients that satisfy a threshold (e.g., achieve a minimum gain or signal to noise ratio) or a best interpolation coefficient (e.g., highest measurement value). The network entity 910 may start with a boresight direction.

In some aspects, interpolation coefficients may include average values. For example, the network entity 910 may average CSI values of sounded panels and take the average to be the CSI value for non-sounded panels. The network entity 910 may average CSI values of two sounded panels on either side of a non-sounded panel and take the average to be a CSI value for the non-sounded panel.

As shown by reference number 945, the network entity 910 may transmit or receive a communication based at least in part on the CSI for the sounded panel 932 and the CSI for non-sounded panels 934, 936, and 938. This may include transmitting the communication using a precoder matrix that is selected because of the CSI. This may also include receiving data. If the UE 920 transmits a physical uplink shared channel (PUSCH) communication, the network entity 910 may use the SRS-based channel estimation to combine the received signal across the antennas.

In some aspects, there may be M×N panels in a grid (M rows and N columns). During SRS reception, a subset of the panels (sounded panels) may be connected to a baseband modem. The network entity 910 may estimate the channel for the sounded panels and extrapolate the channel estimate to the remaining panels (non-sounded panels). The network entity 910 may interpolate the CSI for the non-sounded panels based at least in part on an angle of arrival (AoA) for the panels. The network entity 910 may use a training procedure offline to learn correlation matrices for various AoAs and store the correlation matrices.

As indicated above, FIG. 9 is provided as an example. Other examples may differ from what is described with respect to FIG. 9.

Figure 10:
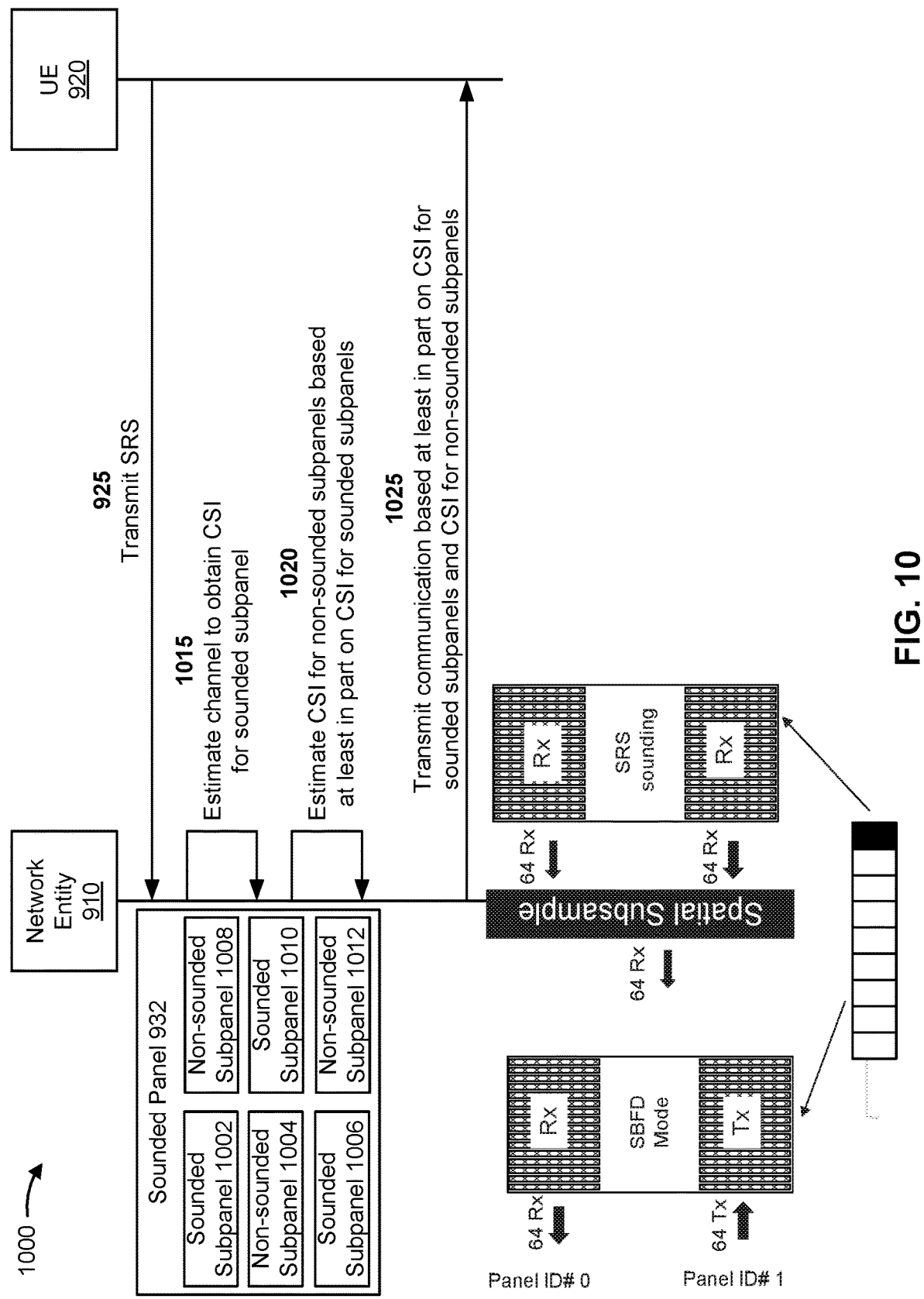
FIG. 10 is a diagram illustrating an example of a multi-panel system using intra-panel subsampling to estimate a channel, in accordance with the present disclosure.

FIG. 10 is a diagram illustrating an example 1000 of a multi-panel system using intra-panel subsampling to estimate a channel, in accordance with the present disclosure. FIG. 10 also shows the network entity 910 and the UE 920.

Example 1000 shows that the network entity 910 (e.g., gNB) may have two panels and 64 transceiver units. In SBFD mode, the top panel is in a receive (Rx) mode while bottom panel is in transmit (Tx) mode. In an SRS mode, the network entity 910 may fall back to half-duplex mode and set all of the panels to the receive mode. However, since there are only 64 Rx chains and 128 RF receive Rx chains, not all of the antenna elements can be sounded.

The sounded panel 932 described in FIG. 9 may include a sounded subpanel 1002, a non-sounded subpanel 1004, a sounded subpanel 1006, a non-sounded subpanel 1008, a sounded subpanel 1010, and a non-sounded subpanel 1012. In example 1000, all of the panels of the multi-panel system may be sounded. It is just that fewer subpanels are sounded in each panel.

As shown by reference number 1015, the network entity 910 may use the SRS to estimate the channel and obtain CSI for sounded subpanels 1002, 1006, and 1010. As shown by reference number 1020, the network entity 910 may use the CSI of the sounded subpanels 1002, 1006, and 1010 to estimate the CSI for the non-sounded subpanels 1004, 1008, and 1012. The network entity 910 may use interpolation coefficients (e.g., weights or averages) as described in connection with FIG. 9. The subsampling may be within the same polarization or across both horizontal and vertical polarizations. As shown by reference number 1025, the network entity 910 may transmit or receive a communication using CSI of the sounded subpanels and the CSI of the non-sounded subpanels.

As indicated above, FIG. 10 is provided as an example. Other examples may differ from what is described with respect to FIG. 10.

FIGS. 11-15 are diagrams illustrating examples of patterns for sounded subpanels and non-sounded subpanels, in accordance with the present disclosure.

Figure 11:
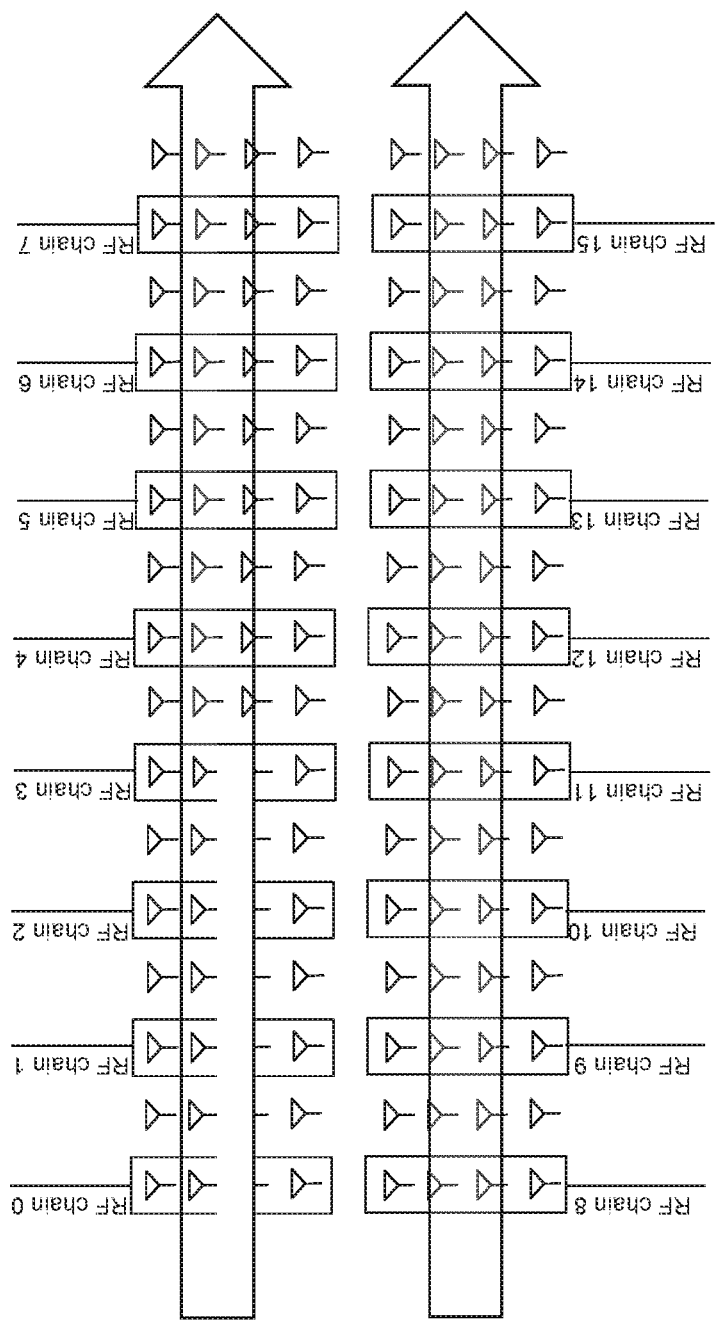
FIGS. 11-15 are diagrams illustrating examples of patterns for sounded subpanels and non-sounded subpanels, in accordance with the present disclosure.
Figure 12:
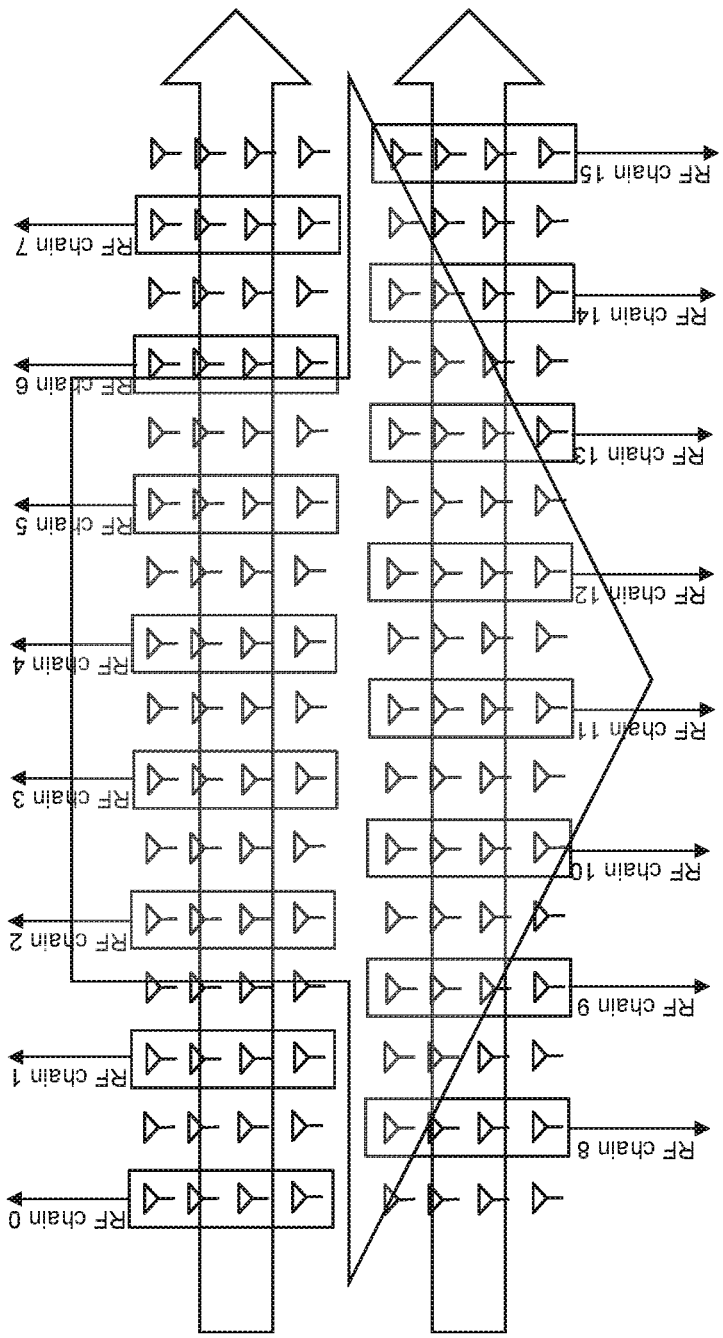

In some aspects, intra-panel subsampling may be uniform (e.g., consistent pattern of sounding across rows) or non-uniform (e.g., different pattern of sounding for each row). FIG. 11 shows intra-panel subsampling that may be uniform. For each row, sounded subpanels alternate with non-sounded subpanels, starting with the same subpanel (e.g., first subpanel). In some aspects, CSI for a non-sounded subpanel may be obtained by averaging CSI values for sounded subpanels on either horizontal side of the non-sounded subpanel. By contrast, FIG. 12 shows a sounding pattern for subpanels that is not uniform across the rows. Every other row may start the alternation of sounded subpanels at a different (e.g., second) subpanel than a neighboring row. The rows alternate between odd subpanels being sounded and even subpanels being sounded. In this way, the alternation of sounded subpanels and non-sounded subpanels may occur in a vertical direction, in addition to the horizontal direction of each row.

Figure 13:
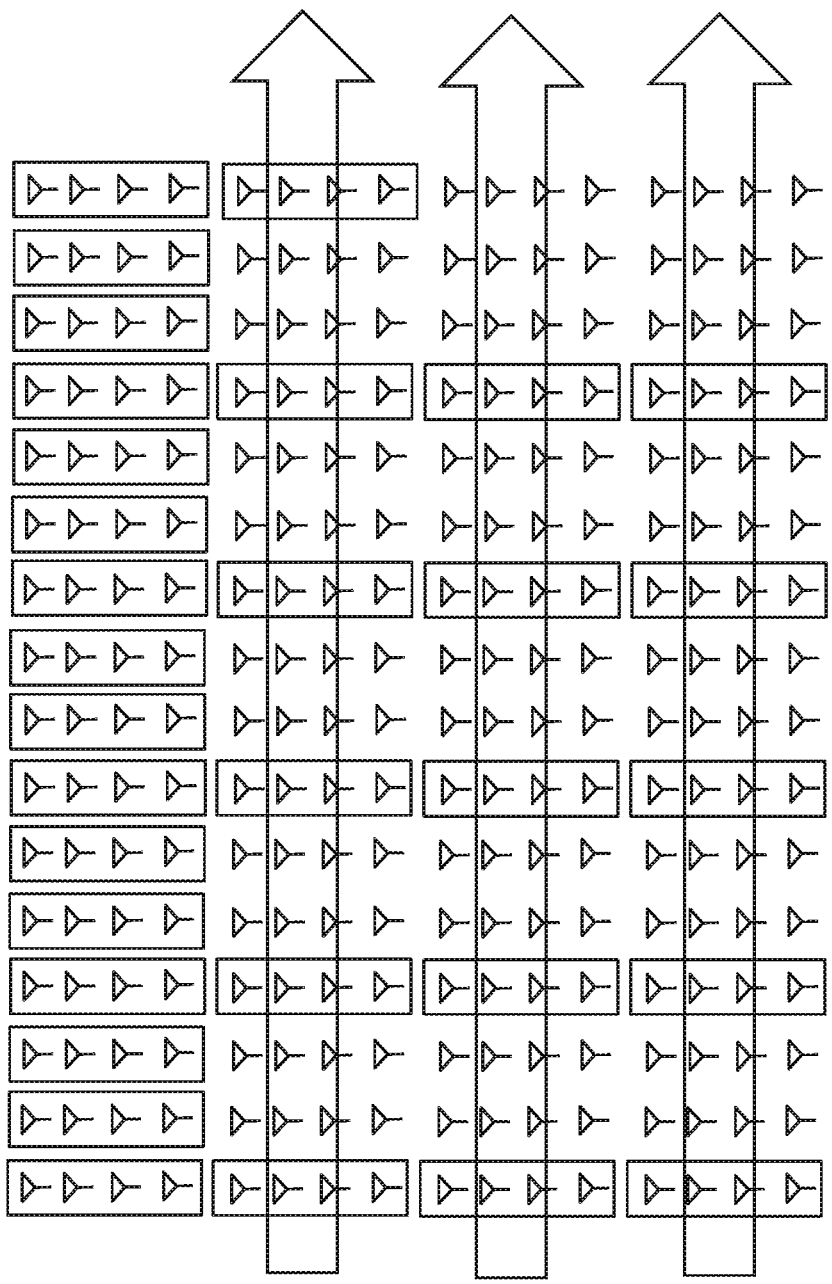
Figure 14:
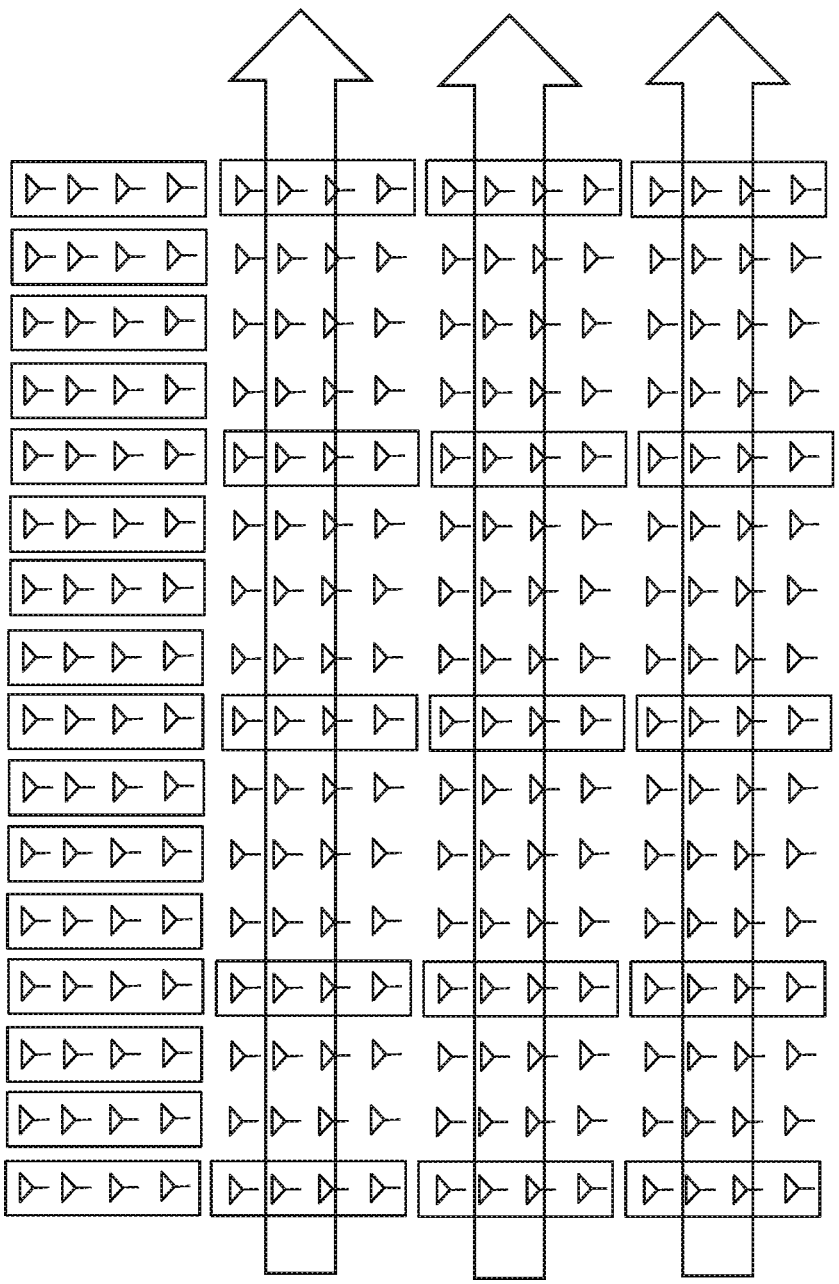
Figure 15:
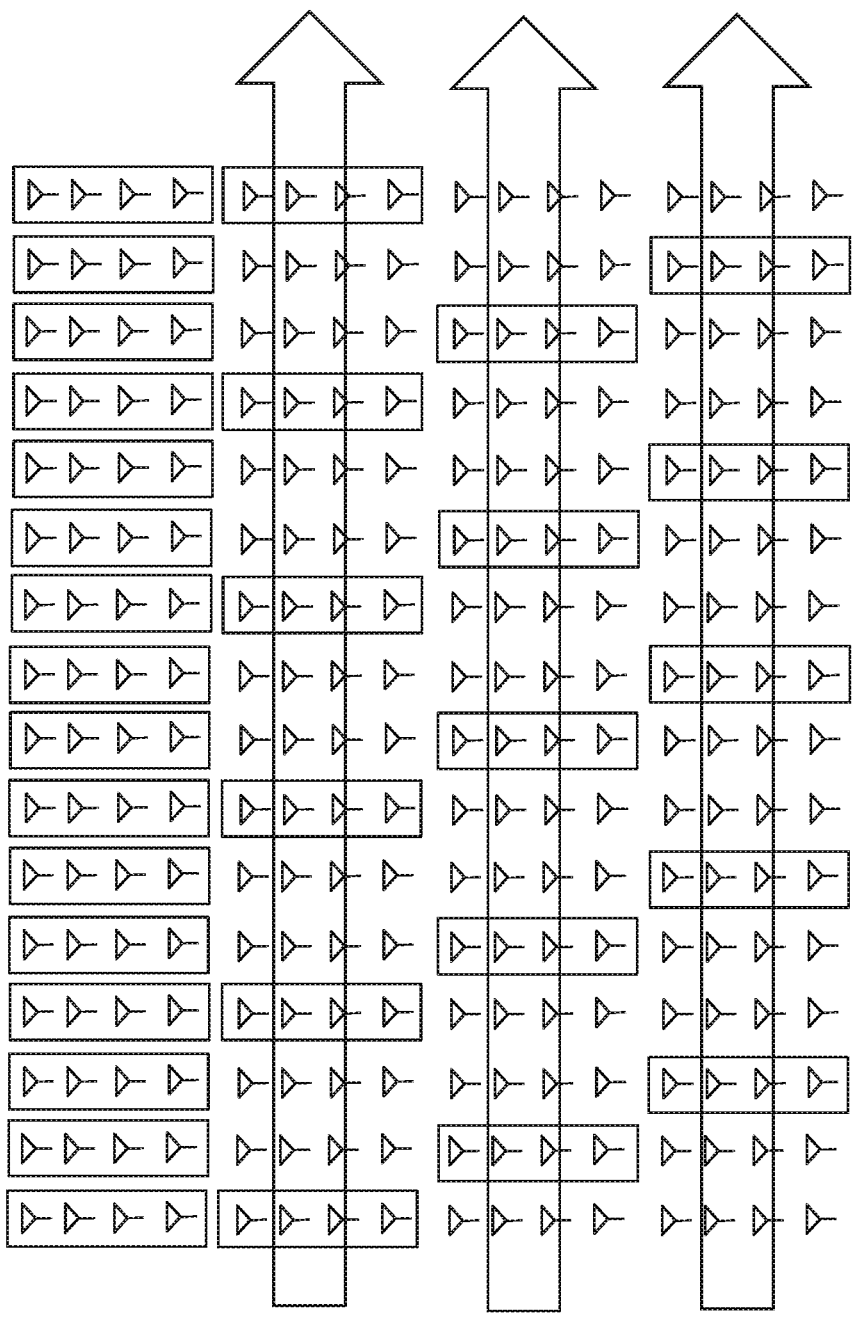

In some aspects, as shown by FIG. 13, a first row may be fully sounded to train a minimum mean square error (MMSE) estimator that learns to use a channel estimation method that minimizes the mean square error. A channel matrix may be used to evaluate the MMSE filter coefficients. FIG. 13 shows that the network entity may apply the learned estimator on the other rows or on another polarization. In FIG. 13, the network entity skips two subpanels between sounded subpanels. In FIG. 14, the network entity skips three subpanels between sounded panels. FIG. 15 shows another example of a non-uniform pattern, where the network entity skips different subpanels in each row. This may introduce some diversity of sounded panels in the vertical direction. By alternating subpanels for sounding in horizontal and vertical directions, the network entity may obtain more accurate channel estimates using intra-panel subsampling.

As indicated above, FIGS. 11-15 provide some examples. Other examples may differ from what is described with regard to FIGS. 11-15.

Figure 16:
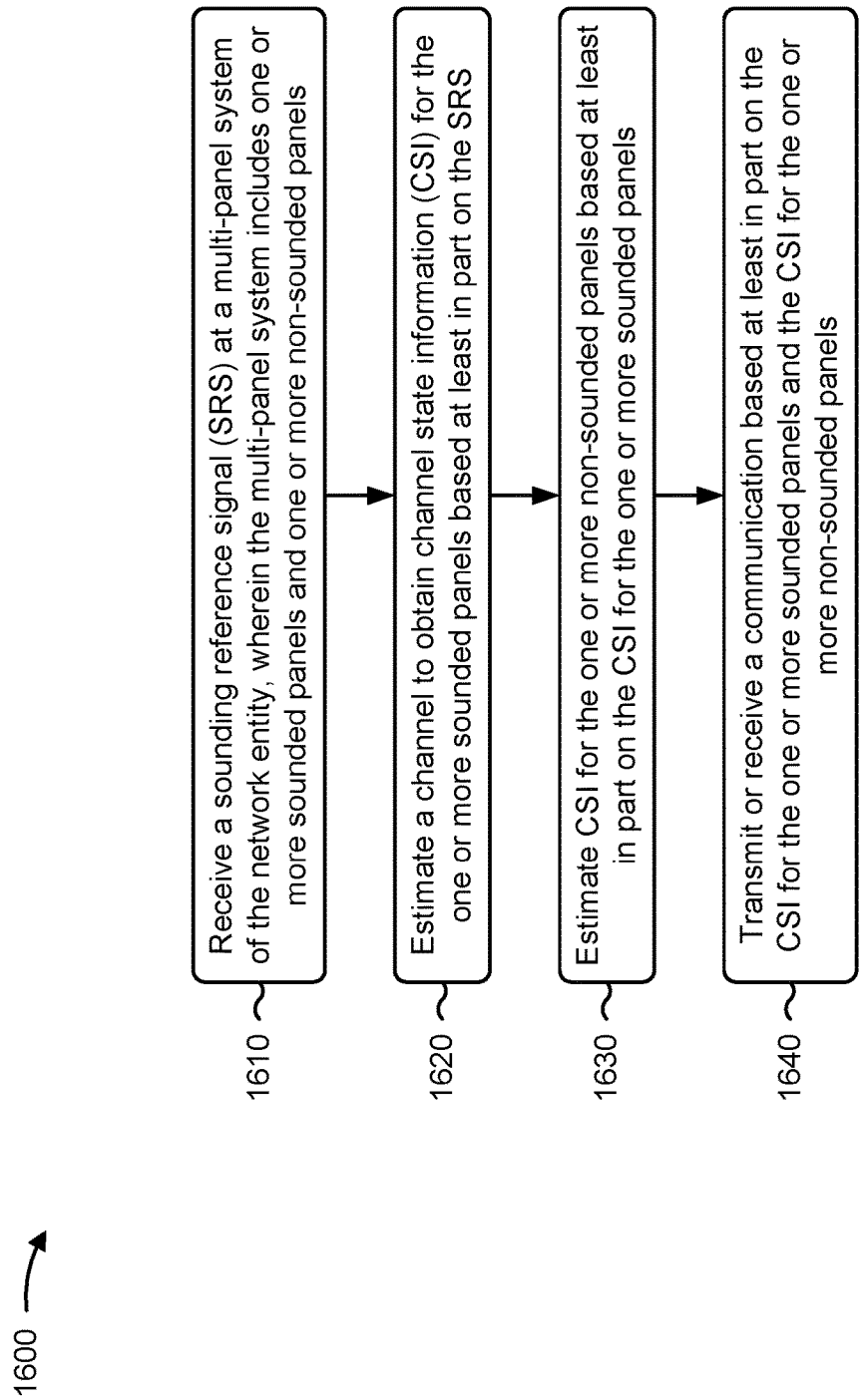
FIG. 16 is a diagram illustrating an example process performed, for example, by a network entity, in accordance with the present disclosure.

FIG. 16 is a diagram illustrating an example process 1600 performed, for example, by a network entity, in accordance with the present disclosure. Example process 1600 is an example where the network entity (e.g., network entity 910) performs operations associated with estimating CSI for non-sounded panels based on CSI for sounded panels.

As shown in FIG. 16, in some aspects, process 1600 may include receiving an SRS at a multi-panel system of the network entity, where the multi-panel system includes one or more sounded panels and one or more non-sounded panels (block 1610). For example, the network entity (e.g., using communication manager 1908 and/or reception component 1902 depicted in FIG. 19) may receive an SRS at a multi-panel system of the network entity, where the multi-panel system includes one or more sounded panels and one or more non-sounded panels, as described above.

As further shown in FIG. 16, in some aspects, process 1600 may include estimating a channel to obtain CSI for the one or more sounded panels based at least in part on the SRS (block 1620). For example, the network entity (e.g., using communication manager 1908 and/or estimation component 1910 depicted in FIG. 19) may estimate a channel to obtain CSI for the one or more sounded panels based at least in part on the SRS, as described above.

As further shown in FIG. 16, in some aspects, process 1600 may include estimating CSI for the one or more non-sounded panels based at least in part on the CSI for the one or more sounded panels (block 1630). For example, the network entity (e.g., using communication manager 1908 and/or estimation component 1910 depicted in FIG. 19) may estimate CSI for the one or more non-sounded panels based at least in part on the CSI for the one or more sounded panels, as described above.

As further shown in FIG. 16, in some aspects, process 1600 may include transmitting or receiving a communication based at least in part on the CSI for the one or more sounded panels and the CSI for the one or more non-sounded panels (block 1640). For example, the network entity (e.g., using communication manager 1908, reception component 1902, and/or transmission component 1904 depicted in FIG. 19) may transmit or receive a communication based at least in part on the CSI for the one or more sounded panels and the CSI for the one or more non-sounded panels, as described above.

Process 1600 may include additional aspects, such as any single aspect or any combination of aspects described below and/or in connection with one or more other processes described elsewhere herein.

In a first aspect, estimating the CSI for the one or more non-sounded panels includes interpolation of the CSI for the one or more sounded panels.

In a second aspect, alone or in combination with the first aspect, process 1600 includes calculating interpolation coefficients based at least in part on beam sweeping.

In a third aspect, alone or in combination with one or more of the first and second aspects, an interpolation coefficient applied to a sounded panel that is spatially closer to a non-sounded panel is greater than an interpolation coefficient applied to a sounded panel that is spatially further away from the non-sounded panel.

In a fourth aspect, alone or in combination with one or more of the first through third aspects, estimating the CSI for the one or more non-sounded panels includes estimating CSI for a non-sounded panel by averaging CSI values of sounded panels on either side of the non-sounded panel.

In a fifth aspect, alone or in combination with one or more of the first through fourth aspects, estimating the CSI for the one or more non-sounded panels includes averaging CSI values of the one or more sounded panels.

In a sixth aspect, alone or in combination with one or more of the first through fifth aspects, process 1600 includes determining, for each of multiple frequency bands, a spatial correlation of the channel between a panel of the multi-panel system and subpanels or between the panel and antenna elements based at least in part on a beam direction of the panel.

In a seventh aspect, alone or in combination with one or more of the first through sixth aspects, process 1600 includes training or calibrating the spatial correlation for each of the multiple frequency bands.

In an eighth aspect, alone or in combination with one or more of the first through seventh aspects, process 1600 includes estimating the channel to obtain CSI for one or more sounded subpanels of the panel, based at least in part on the SRS, where the one or more sounded subpanels are a proper subset of subpanels of the panel, and estimating CSI for one or more non-sounded subpanels of the panel based at least in part on the CSI for the one or more sounded subpanels.

In a ninth aspect, alone or in combination with one or more of the first through eighth aspects, estimating the CSI for the one or more non-sounded panels includes estimating the CSI for the one or more non-sounded panels based at least in part on angles of arrival of the SRS for the one or more non-sounded panels and angles of arrival of the SRS for the one or more sounded panels.

In a tenth aspect, alone or in combination with one or more of the first through ninth aspects, process 1600 includes generating correlation matrices for angles of arrival for the multi-panel system based at least in part on a training procedure for the multi-panel system.

In an eleventh aspect, alone or in combination with one or more of the first through tenth aspects, process 1600 includes cycling, for multiple SRSs, antenna elements of the subpanel that are sampled, and estimating, for each cycle, samples for other antenna elements of the subpanel based at least in part on an antenna element that is sampled in the cycle.

In a twelfth aspect, alone or in combination with one or more of the first through eleventh aspects, process 1600 includes cycling, for multiple SRSs, antenna elements of the subpanel that are sampled, and estimating, for each cycle, samples for other antenna elements of the subpanel based at least in part on a spatial configuration of the subpanel.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
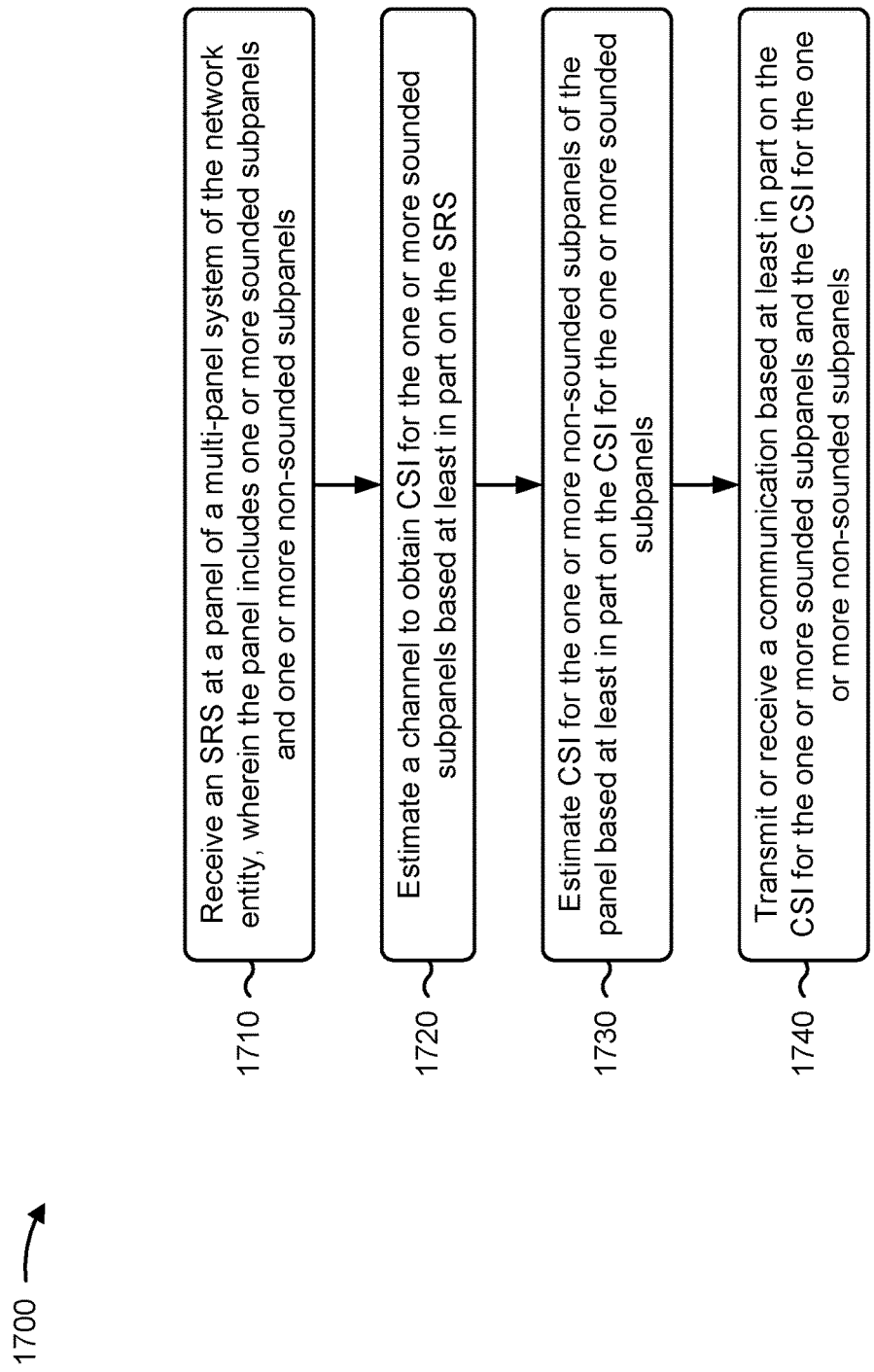
FIG. 17 is a diagram illustrating an example process performed, for example, by a network entity, in accordance with the present disclosure.

FIG. 17 is a diagram illustrating an example process 1700 performed, for example, by a network entity, in accordance with the present disclosure. Example process 1700 is an example where the network entity (e.g., network entity 910) performs operations associated with estimating CSI for non-sounded subpanels based on CSI for sounded subpanels.

As shown in FIG. 17, in some aspects, process 1700 may include receiving an SRS at a panel of a multi-panel system of the network entity, where the panel includes one or more sounded subpanels and one or more non-sounded subpanels (block 1710). For example, the network entity (e.g., using communication manager 1908 and/or reception component 1902 depicted in FIG. 19) may receive an SRS at a panel of a multi-panel system of the network entity, where the panel includes one or more sounded subpanels and one or more non-sounded subpanels, as described above.

As further shown in FIG. 17, in some aspects, process 1700 may include estimating a channel to obtain CSI for the one or more sounded subpanels based at least in part on the SRS (block 1720). For example, the network entity (e.g., using communication manager 1908 and/or estimation component 1910 depicted in FIG. 19) may estimate a channel to obtain CSI for the one or more sounded subpanels based at least in part on the SRS, as described above.

As further shown in FIG. 17, in some aspects, process 1700 may include estimating CSI for the one or more non-sounded subpanels of the panel based at least in part on the CSI for the one or more sounded subpanels (block 1730). For example, the network entity (e.g., using communication manager 1908 and/or estimation component 1910 depicted in FIG. 19) may estimate CSI for the one or more non-sounded subpanels of the panel based at least in part on the CSI for the one or more sounded subpanels, as described above.

As further shown in FIG. 17, in some aspects, process 1700 may include transmitting or receiving a communication based at least in part on the CSI for the one or more sounded subpanels and the CSI for the one or more non-sounded subpanels (block 1740). For example, the network entity (e.g., using communication manager 1908, reception component 1902, and/or transmission component 1904 depicted in FIG. 19) may transmit or receive a communication based at least in part on the CSI for the one or more sounded subpanels and the CSI for the one or more non-sounded subpanels, as described above.

Process 1700 may include additional aspects, such as any single aspect or any combination of aspects described below and/or in connection with one or more other processes described elsewhere herein.

In a first aspect, estimating the CSI for the one or more non-sounded subpanels includes interpolation of the CSI for the one or more sounded subpanels.

In a second aspect, alone or in combination with the first aspect, process 1700 includes calculating interpolation coefficients based at least in part on beam sweeping.

In a third aspect, alone or in combination with one or more of the first and second aspects, an interpolation coefficient applied to a sounded subpanel that is spatially closer to a non-sounded subpanel is greater than an interpolation coefficient applied to a sounded subpanel that is spatially further away from the non-sounded subpanel.

In a fourth aspect, alone or in combination with one or more of the first through third aspects, estimating the CSI for the one or more non-sounded subpanels includes estimating CSI for a non-sounded subpanel by averaging CSI values of sounded subpanels on either side of the non-sounded subpanel.

In a fifth aspect, alone or in combination with one or more of the first through fourth aspects, estimating the CSI for the one or more non-sounded subpanels includes averaging CSI values of the one or more sounded subpanels.

In a sixth aspect, alone or in combination with one or more of the first through fifth aspects, process 1700 includes determining, for each of multiple frequency bands, a spatial correlation of the channel between a panel of the multi-panel system and subpanels or between the panel and antenna elements based at least in part on a beam direction of the panel.

In a seventh aspect, alone or in combination with one or more of the first through sixth aspects, process 1700 includes training or calibrating the spatial correlation for each of the multiple frequency bands.

In an eighth aspect, alone or in combination with one or more of the first through seventh aspects, estimating the channel for the one or more sounded subpanels includes estimating the channel for every other subpanel in a first row of the panel.

In a ninth aspect, alone or in combination with one or more of the first through eighth aspects, estimating the channel for the one or more sounded subpanels further includes estimating the channel for one or more sounded subpanels in a second row of the panel, based at least in part on the SRS, where the one or more sounded subpanels in the second row alternate in a vertical direction with the one or more sounded subpanels in the first row.

In a tenth aspect, alone or in combination with one or more of the first through ninth aspects, process 1700 includes estimating the channel to obtain CSI for every subpanel in a specified row, and estimating CSI for non-sounded panels in the first row based at least in part on the CSI for the specified row.

In an eleventh aspect, alone or in combination with one or more of the first through tenth aspects, estimating the channel for the one or more sounded subpanels includes skipping channel estimation for multiple subpanels between sounded subpanels in a first row.

In a twelfth aspect, alone or in combination with one or more of the first through eleventh aspects, estimating the channel for the one or more sounded subpanels further includes estimating the channel for sounded subpanels in a second row of the panel, based at least in part on the SRS, by skipping multiple subpanels between the sounded subpanels in the second row, where the sounded subpanels in the second row alternate in a vertical direction with the sounded subpanels in the first row.

In a thirteenth aspect, alone or in combination with one or more of the first through twelfth aspects, process 1700 includes cycling, for multiple SRSs, antenna elements of the sounded subpanel that are sampled, and estimating, for each cycle, samples for other antenna elements of the sounded subpanel based at least in part on an antenna element that is sampled in the cycle.

In a fourteenth aspect, alone or in combination with one or more of the first through thirteenth aspects, process 1700 includes cycling, for multiple SRSs, antenna elements of the sounded subpanel that are sampled, and estimating, for each cycle, samples for other antenna elements of the sounded subpanel based at least in part on a spatial configuration of the sounded subpanel or a spatial correlation between antenna elements.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
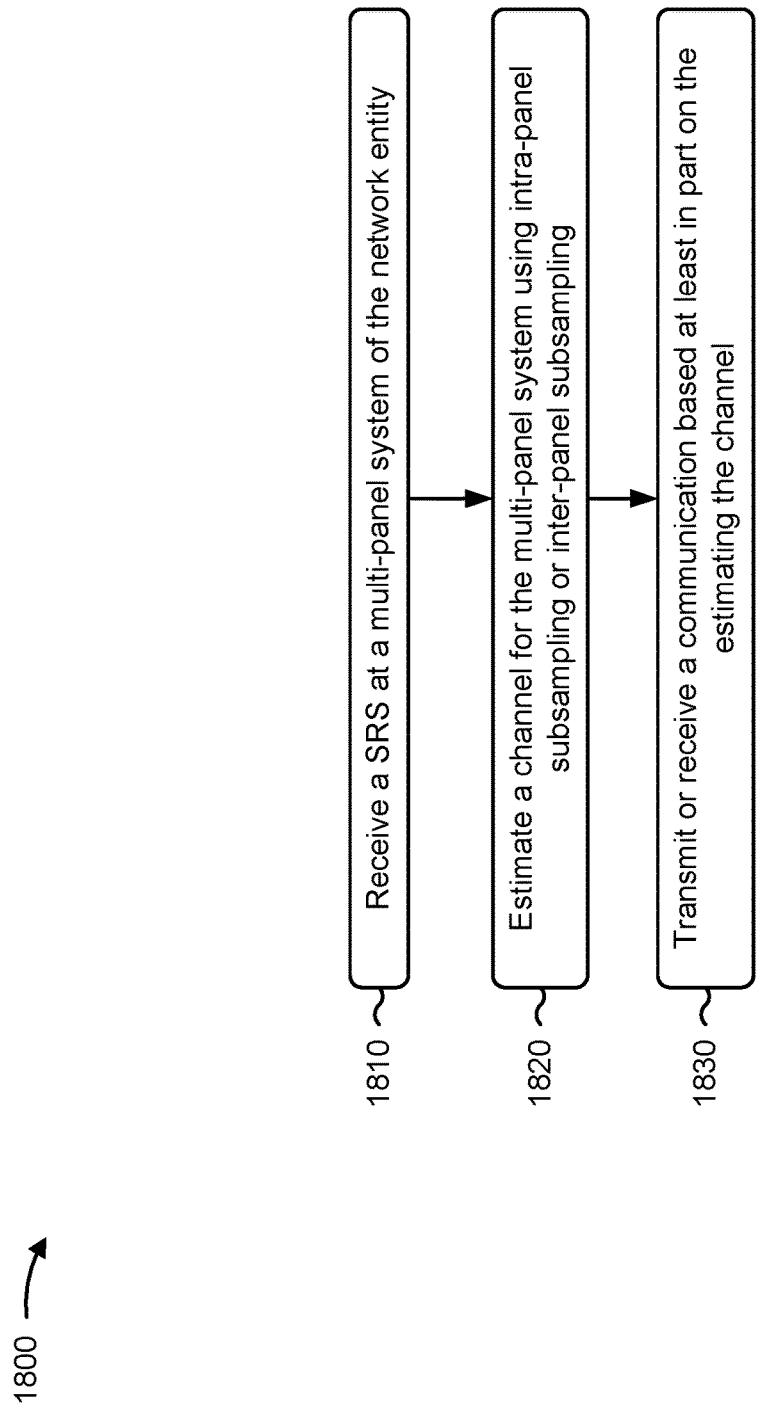
FIG. 18 is a diagram illustrating an example process performed, for example, by a network entity, in accordance with the present disclosure.

FIG. 18 is a diagram illustrating an example process 1800 performed, for example, by a network entity, in accordance with the present disclosure. Example process 1800 is an example where the network entity (e.g., network entity 910) performs operations associated with estimating a channel using subsampling of panels or subpanels.

As shown in FIG. 18, in some aspects, process 1800 may include receiving an SRS at a multi-panel system of the network entity (block 1810). For example, the network entity (e.g., using communication manager 1908 and/or reception component 1902 depicted in FIG. 19) may receive an SRS at a multi-panel system of the network entity, as described above.

As further shown in FIG. 18, in some aspects, process 1800 may include estimating a channel for the multi-panel system using intra-panel subsampling or inter-panel subsampling (block 1820). For example, the network entity (e.g., using communication manager 1908 and/or estimation component 1910 depicted in FIG. 19) may estimate a channel for the multi-panel system using intra-panel subsampling or inter-panel subsampling, as described above.

As further shown in FIG. 18, in some aspects, process 1800 may include transmitting or receiving a communication based at least in part on the estimating the channel (block 1830). For example, the network entity (e.g., using communication manager 1908, reception component 1902, and/or transmission component 1904 depicted in FIG. 19) may transmit or receive a communication based at least in part on the estimating the channel, as described above.

Process 1800 may include additional aspects, such as any single aspect or any combination of aspects described below and/or in connection with one or more other processes described elsewhere herein.

In a first aspect, estimating the channel further includes estimating the channel using one or more of intra-subpanel subsampling or intra-polarization subsampling.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
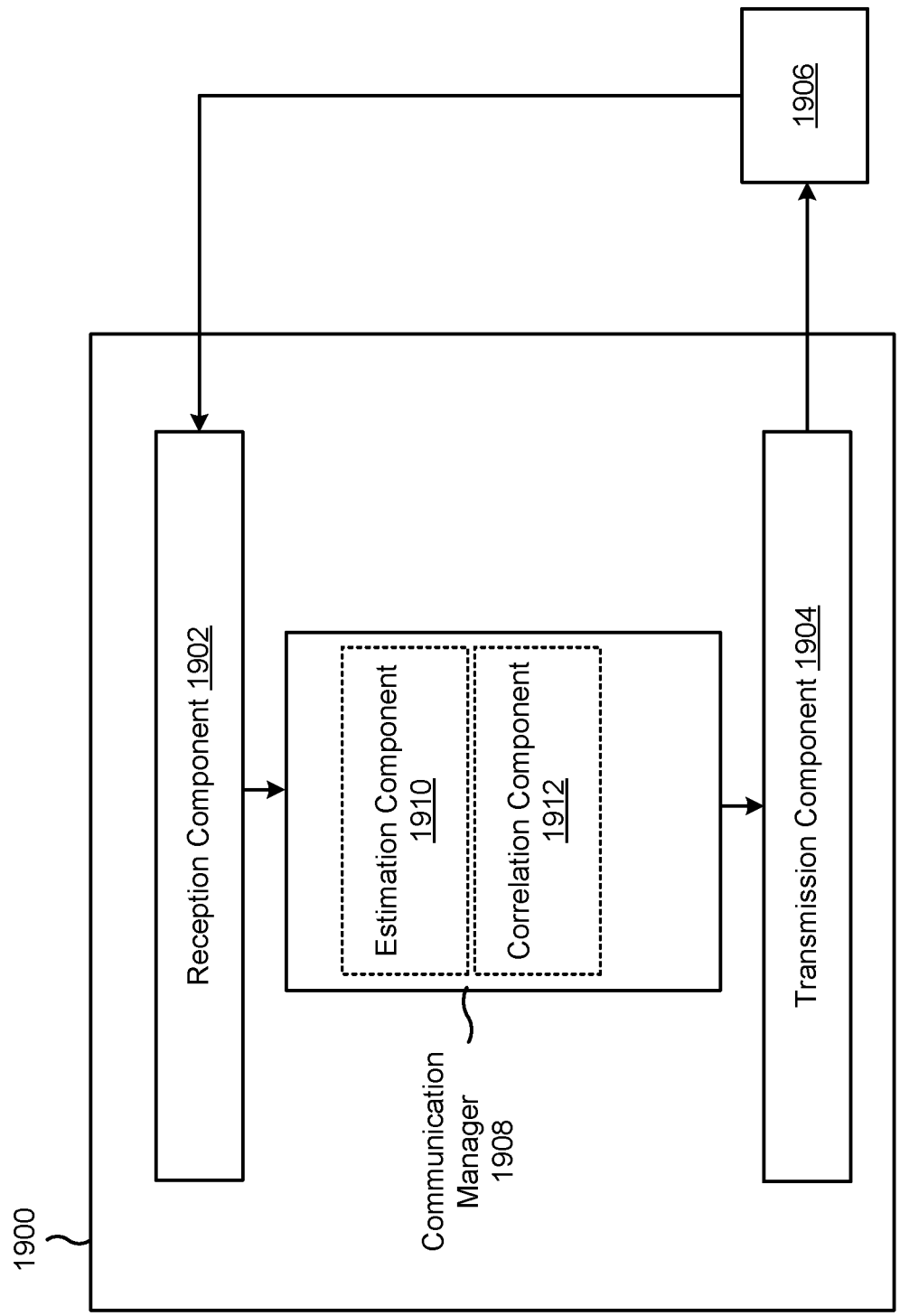
FIG. 19 is a diagram of an example apparatus for wireless communication, in accordance with the present disclosure.

FIG. 19 is a diagram of an example apparatus 1900 for wireless communication. The apparatus 1900 may be a network entity (e.g., network entity 910), or a network entity may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include the communication manager 1908. The communication manager 1908 may control and/or otherwise manage one or more operations of the reception component 1902 and/or the transmission component 1904. In some aspects, the communication manager 1908 may include one or more antennas, a modem, a controller/processor, a memory, or a combination thereof, of the base station described in connection with FIG. 2. The communication manager 1908 may be, or be similar to, the communication manager 150 depicted in FIGS. 1 and 2. For example, in some aspects, the communication manager 1908 may be configured to perform one or more of the functions described as being performed by the communication manager 150. In some aspects, the communication manager 1908 may include the reception component 1902 and/or the transmission component 1904. The communication manager 1908 may include an estimation component 1910 and/or a correlation component 1912, among other examples.

In some aspects, the apparatus 1900 may be configured to perform one or more operations described herein in connection with FIG. 1-15. Additionally, or alternatively, the apparatus 1900 may be configured to perform one or more processes described herein, such as process 1600 of FIG. 16, process 1700 of FIG. 17, process 1800 of FIG. 18, or a combination thereof. In some aspects, the apparatus 1900 and/or one or more components shown in FIG. 19 may include one or more components of the network entity described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the network entity described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modem, a modulator, a transmit MIMO processor, a transmit processor, a controller/processor, a memory, or a combination thereof, of the network entity described in connection with FIG. 2. In some aspects, the transmission component 1904 may be co-located with the reception component 1902 in a transceiver.

In some aspects, the reception component 1902 may receive an SRS at a multi-panel system of the network entity, wherein the multi-panel system includes one or more sounded panels and one or more non-sounded panels. The estimation component 1910 may estimate a channel to obtain CSI for the one or more sounded panels based at least in part on the SRS. The estimation component 1910 may estimate CSI for the one or more non-sounded panels based at least in part on the CSI for the one or more sounded panels. The transmission component 1904 may transmit or the reception component 1902 may receive a communication based at least in part on the CSI for the one or more sounded panels and the CSI for the one or more non-sounded panels. The estimation component 1910 may calculate interpolation coefficients based at least in part on beam sweeping.

The correlation component 1912 may determine, for each of multiple frequency bands, a spatial correlation of the channel between a panel of the multi-panel system and subpanels or between the panel and antenna elements based at least in part on a beam direction of the panel. The correlation component 1912 may train or calibrate the spatial correlation for each of the multiple frequency bands.

The estimation component 1910 may estimate the channel to obtain CSI for one or more sounded subpanels of the panel, based at least in part on the SRS, wherein the one or more sounded subpanels are a proper subset of subpanels of the panel. The estimation component 1910 may estimate CSI for one or more non-sounded subpanels of the panel based at least in part on the CSI for the one or more sounded subpanels.

The correlation component 1912 may generate correlation matrices for angles of arrival for the multi-panel system based at least in part on a training procedure for the multi-panel system.

In some aspects, the reception component 1902 may receive an SRS at a panel of a multi-panel system of the network entity, wherein the panel includes one or more sounded subpanels and one or more non-sounded subpanels. The estimation component 1910 may estimate a channel to obtain CSI for the one or more sounded subpanels based at least in part on the SRS. The estimation component 1910 may estimate CSI for the one or more non-sounded subpanels of the panel based at least in part on the CSI for the one or more sounded subpanels. The transmission component 1904 may transmit or the reception component 1902 may receive a communication based at least in part on the CSI for the one or more sounded subpanels and the CSI for the one or more non-sounded subpanels. The estimation component 1910 may calculate interpolation coefficients based at least in part on beam sweeping.

The correlation component 1912 may determine, for each of multiple frequency bands, a spatial correlation of the channel between a panel of the multi-panel system and subpanels or between the panel and antenna elements based at least in part on a beam direction of the panel. The correlation component 1912 may train or calibrate the spatial correlation for each of the multiple frequency bands.

The estimation component 1910 may estimate the channel to obtain CSI for every subpanel in a specified row. The estimation component 1910 may estimate CSI for non-sounded panels in the first row based at least in part on the CSI for the specified row.

In some aspects, the reception component 1902 may receive an SRS at a multi-panel system of the network entity. The estimation component 1910 may estimate a channel for the multi-panel system using intra-panel subsampling or inter-panel subsampling. The transmission component 1904 may transmit or the reception component 1902 may receive a communication based at least in part on the estimating the channel.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of some Aspects of the present disclosure:

Aspect 1: A method of wireless communication performed by a network entity, comprising: receiving a sounding reference signal (SRS) at a multi-panel system of the network entity, wherein the multi-panel system includes one or more sounded panels and one or more non-sounded panels; estimating a channel to obtain channel state information (CSI) for the one or more sounded panels based at least in part on the SRS; estimating CSI for the one or more non-sounded panels based at least in part on the CSI for the one or more sounded panels; and transmitting or receiving a communication based at least in part on the CSI for the one or more sounded panels and the CSI for the one or more non-sounded panels.

Aspect 2: The method of Aspect 1, wherein estimating the CSI for the one or more non-sounded panels includes interpolation of the CSI for the one or more sounded panels.

Aspect 3: The method of Aspect 2, further comprising calculating interpolation coefficients based at least in part on beam sweeping.

Aspect 4: The method of Aspect 2 or 3, wherein an interpolation coefficient applied to a sounded panel that is spatially closer to a non-sounded panel is greater than an interpolation coefficient applied to a sounded panel that is spatially further away from the non-sounded panel.

Aspect 5: The method of any of Aspects 1-4, wherein estimating the CSI for the one or more non-sounded panels includes estimating CSI for a non-sounded panel by averaging CSI values of sounded panels on either side of the non-sounded panel.

Aspect 6: The method of any of Aspects 1-5, wherein estimating the CSI for the one or more non-sounded panels includes averaging CSI values of the one or more sounded panels.

Aspect 7: The method of any of Aspects 1-6, further comprising determining, for each of multiple frequency bands, a spatial correlation of the channel between a panel of the multi-panel system and subpanels or between the panel and antenna elements based at least in part on a beam direction of the panel.

Aspect 8: The method of Aspect 7, further comprising training or calibrating the spatial correlation for each of the multiple frequency bands.

Aspect 9: The method of any of Aspects 1-8, further comprising, for each sounded panel of the one or more sounded panels: estimating the channel to obtain CSI for one or more sounded subpanels of the panel, based at least in part on the SRS, wherein the one or more sounded subpanels are a proper subset of subpanels of the panel; and estimating CSI for one or more non-sounded subpanels of the panel based at least in part on the CSI for the one or more sounded subpanels.

Aspect 10: The method of any of Aspects 1-9, wherein estimating the CSI for the one or more non-sounded panels includes estimating the CSI for the one or more non-sounded panels based at least in part on angles of arrival of the SRS for the one or more non-sounded panels and angles of arrival of the SRS for the one or more sounded panels.

Aspect 11: The method of Aspect 10, further comprising generating correlation matrices for angles of arrival for the multi-panel system based at least in part on a training procedure for the multi-panel system.

Aspect 12: The method of any of Aspects 1-11, further comprising, for a subpanel of a sounded panel: cycling, for multiple SRSs, antenna elements of the subpanel that are sampled; and estimating, for each cycle, samples for other antenna elements of the subpanel based at least in part on an antenna element that is sampled in the cycle.

Aspect 13: The method of any of Aspects 1-12, further comprising, for a subpanel of a sounded panel: cycling, for multiple SRSs, antenna elements of the subpanel that are sampled; and estimating, for each cycle, samples for other antenna elements of the subpanel based at least in part on a spatial configuration of the subpanel.

Aspect 14: A method of wireless communication performed by a network entity, comprising: receiving a sounding reference signal (SRS) at a panel of a multi-panel system of the network entity, wherein the panel includes one or more sounded subpanels and one or more non-sounded subpanels; estimating a channel to obtain channel state information (CSI) for the one or more sounded subpanels based at least in part on the SRS; estimating CSI for the one or more non-sounded subpanels of the panel based at least in part on the CSI for the one or more sounded subpanels; and transmitting or receiving a communication based at least in part on the CSI for the one or more sounded subpanels and the CSI for the one or more non-sounded subpanels.

Aspect 15: The method of Aspect 14, wherein estimating the CSI for the one or more non-sounded subpanels includes interpolation of the CSI for the one or more sounded subpanels.

Aspect 16: The method of Aspect 15, further comprising calculating interpolation coefficients based at least in part on beam sweeping.

Aspect 17: The method of Aspect 15 or 16, wherein an interpolation coefficient applied to a sounded subpanel that is spatially closer to a non-sounded subpanel is greater than an interpolation coefficient applied to a sounded subpanel that is spatially further away from the non-sounded subpanel.

Aspect 18: The method of any of Aspects 14-17, wherein estimating the CSI for the one or more non-sounded subpanels includes estimating CSI for a non-sounded subpanel by averaging CSI values of sounded subpanels on either side of the non-sounded subpanel.

Aspect 19: The method of any of Aspects 14-18, wherein estimating the CSI for the one or more non-sounded subpanels includes averaging CSI values of the one or more sounded subpanels.

Aspect 20: The method of any of Aspects 14-19, further comprising determining, for each of multiple frequency bands, a spatial correlation of the channel between a panel of the multi-panel system and subpanels or between the panel and antenna elements based at least in part on a beam direction of the panel.

Aspect 21: The method of Aspect 20, further comprising training or calibrating the spatial correlation for each of the multiple frequency bands.

Aspect 22: The method of any of Aspects 14-21, wherein estimating the channel for the one or more sounded subpanels includes estimating the channel for every other subpanel in a first row of the panel.

Aspect 23: The method of Aspect 22, wherein estimating the channel for the one or more sounded subpanels further includes estimating the channel for one or more sounded subpanels in a second row of the panel, based at least in part on the SRS, wherein the one or more sounded subpanels in the second row alternate in a vertical direction with the one or more sounded subpanels in the first row.

Aspect 24: The method of Aspect 22 or 23, further comprising: estimating the channel to obtain CSI for every subpanel in a specified row; and estimating CSI for non-sounded panels in the first row based at least in part on the CSI for the specified row.

Aspect 25: The method of any of Aspects 14-24, wherein estimating the channel for the one or more sounded subpanels includes skipping channel estimation for multiple subpanels between sounded subpanels in a first row.

Aspect 26: The method of Aspect 25, wherein estimating the channel for the one or more sounded subpanels further includes estimating the channel for sounded subpanels in a second row of the panel, based at least in part on the SRS, by skipping multiple subpanels between the sounded subpanels in the second row, wherein the sounded subpanels in the second row alternate in a vertical direction with the sounded subpanels in the first row.

Aspect 27: The method of any of Aspects 14-26, further comprising, for a sounded subpanel of the panel: cycling, for multiple SRSs, antenna elements of the sounded subpanel that are sampled; and estimating, for each cycle, samples for other antenna elements of the sounded subpanel based at least in part on an antenna element that is sampled in the cycle.

Aspect 28: The method of any of Aspects 14-27, further comprising, for a sounded subpanel of the panel: cycling, for multiple SRSs, antenna elements of the sounded subpanel that are sampled; and estimating, for each cycle, samples for other antenna elements of the sounded subpanel based at least in part on a spatial configuration of the sounded subpanel or a spatial correlation between antenna elements.

Aspect 29: A method of wireless communication performed by a network entity, comprising: receiving a sounding reference signal (SRS) at a multi-panel system of the network entity; estimating a channel for the multi-panel system using intra-panel sub sampling or inter-panel sub-sampling; and transmitting or receiving a communication based at least in part on the estimating the channel.

Aspect 30: The method of Aspect 29, wherein estimating the channel further includes estimating the channel using one or more of intra-subpanel subsampling or intra-polarization subsampling.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:
   a memory; and
   one or more processors, coupled to the memory, configured to:
      receive a sounding reference signal (SRS) at a multi-panel system of the network entity, wherein the multi-panel system includes one or more sounded panels and one or more non-sounded panels;
      estimate a channel to obtain channel state information (CSI) for the one or more sounded panels based at least in part on the SRS;
      estimate CSI for the one or more non-sounded panels based at least in part on the CSI for the one or more sounded panels; and
      transmit or receive a communication based at least in part on the CSI for the one or more sounded panels and the CSI for the one or more non-sounded panels.

2. The network entity of claim 1, wherein the one or more processors, to estimate the CSI for the one or more non-sounded panels, are configured to interpolate the CSI for the one or more sounded panels.

3. The network entity of claim 2, wherein the one or more processors are configured to calculate interpolation coefficients based at least in part on beam sweeping.

4. The network entity of claim 2, wherein an interpolation coefficient applied to a sounded panel that is spatially closer to a non-sounded panel is greater than an interpolation coefficient applied to a sounded panel that is spatially further away from the non-sounded panel.

5. The network entity of claim 1, wherein the one or more processors, to estimate the CSI for the one or more non-sounded panels, are configured to estimate CSI for a non-sounded panel by averaging CSI values of sounded panels on either side of the non-sounded panel.

6. The network entity of claim 1, wherein the one or more processors, to estimate the CSI for the one or more non-sounded panels, are configured to average CSI values of the one or more sounded panels.

7. The network entity of claim 1, wherein the one or more processors are configured to determine, for each of multiple frequency bands, a spatial correlation of the channel between a panel of the multi-panel system and subpanels or between the panel and antenna elements based at least in part on a beam direction of the panel.

8. The network entity of claim 7, wherein the one or more processors are configured to train or calibrate the spatial correlation for each of the multiple frequency bands.

9. The network entity of claim 1, wherein the one or more processors are configured to, for each sounded panel of the one or more sounded panels:
      estimate the channel to obtain CSI for one or more sounded subpanels of the panel, based at least in part on the SRS, wherein the one or more sounded subpanels are a proper subset of subpanels of the panel; and
      estimate CSI for one or more non-sounded subpanels of the panel based at least in part on the CSI for the one or more sounded subpanels.

10. The network entity of claim 1, wherein the one or more processors, to estimate the CSI for the one or more non-sounded panels, are configured to estimate the CSI for the one or more non-sounded panels based at least in part on angles of arrival of the SRS for the one or more non-sounded panels and angles of arrival of the SRS for the one or more sounded panels.

11. The network entity of claim 10, wherein the one or more processors are configured to generate correlation matrices for angles of arrival for the multi-panel system based at least in part on a training procedure for the multi-panel system.

12. The network entity of claim 1, wherein the one or more processors are configured to, for a subpanel of a sounded panel:
      cycle, for multiple SRSs, antenna elements of the subpanel that are sampled; and
      estimate, for each cycle, samples for other antenna elements of the subpanel based at least in part on an antenna element that is sampled in the cycle.

13. The network entity of claim 1, wherein the one or more processors are configured to, for a subpanel of a sounded panel:
      cycle, for multiple SRSs, antenna elements of the subpanel that are sampled; and
      estimate, for each cycle, samples for other antenna elements of the subpanel based at least in part on a spatial configuration of the subpanel.

14. A network entity for wireless communication, comprising:
   a memory; and
   one or more processors, coupled to the memory, configured to:
      receive a sounding reference signal (SRS) at a panel of a multi-panel system of the network entity, wherein the panel includes one or more sounded subpanels and one or more non-sounded subpanels;
      estimate a channel to obtain channel state information (CSI) for the one or more sounded subpanels based at least in part on the SRS;
      estimate CSI for the one or more non-sounded subpanels of the panel based at least in part on the CSI for the one or more sounded subpanels; and
      transmit or receive a communication based at least in part on the CSI for the one or more sounded subpanels and the CSI for the one or more non-sounded subpanels.

15. The network entity of claim 14, wherein the one or more processors, to estimate the CSI for the one or more non-sounded subpanels, are configured to interpolate the CSI for the one or more sounded subpanels.

16. The network entity of claim 15, wherein the one or more processors are configured to calculate interpolation coefficients based at least in part on beam sweeping.

17. The network entity of claim 15, wherein an interpolation coefficient applied to a sounded subpanel that is spatially closer to a non-sounded subpanel is greater than an interpolation coefficient applied to a sounded subpanel that is spatially further away from the non-sounded subpanel.

18. The network entity of claim 14, wherein the one or more processors, to estimate the CSI for the one or more non-sounded subpanels, are configured to estimate CSI for a non-sounded subpanel by averaging CSI values of sounded subpanels on either side of the non-sounded subpanel.

19. The network entity of claim 14, wherein the one or more processors, to estimate the CSI for the one or more non-sounded subpanels, are configured to average CSI values of the one or more sounded subpanels.

20. The network entity of claim 14, wherein the one or more processors are configured to determine, for each of multiple frequency bands, a spatial correlation of the channel between a panel of the multi-panel system and subpanels or between the panel and antenna elements based at least in part on a beam direction of the panel.

21. The network entity of claim 20, wherein the one or more processors are configured to train or calibrate the spatial correlation for each of the multiple frequency bands.

22. The network entity of claim 14, wherein the one or more processors, to estimate the channel for the one or more sounded subpanels, are configured to estimate the channel for every other subpanel in a first row of the panel.

23. The network entity of claim 22, wherein the one or more processors, to estimate the channel for the one or more sounded subpanels, are configured to estimate the channel for one or more sounded subpanels in a second row of the panel, based at least in part on the SRS, wherein the one or more sounded subpanels in the second row alternate in a vertical direction with the one or more sounded subpanels in the first row.

24. The network entity of claim 22, wherein the one or more processors are configured to:
  estimate the channel to obtain CSI for every subpanel in a specified row; and
  estimate CSI for non-sounded panels in the first row based at least in part on the CSI for the specified row.

25. The network entity of claim 14, wherein the one or more processors, to estimate the channel for the one or more sounded subpanels, are configured to skip channel estimation for multiple subpanels between sounded subpanels in a first row.

26. The network entity of claim 25, wherein the one or more processors, to estimate the channel for the one or more sounded subpanels, are configured to estimate the channel for sounded subpanels in a second row of the panel, based at least in part on the SRS, by skipping multiple subpanels between the sounded subpanels in the second row, wherein the sounded subpanels in the second row alternate in a vertical direction with the sounded subpanels in the first row.

27. The network entity of claim 14, wherein the one or more processors are configured to, for a sounded subpanel of the panel:
  cycle, for multiple SRSs, antenna elements of the sounded subpanel that are sampled; and
  estimate, for each cycle, samples for other antenna elements of the sounded subpanel based at least in part on an antenna element that is sampled in the cycle.

28. The network entity of claim 14, wherein the one or more processors are configured to, for a sounded subpanel of the panel:
  cycle, for multiple SRSs, antenna elements of the sounded subpanel that are sampled; and
  estimate, for each cycle, samples for other antenna elements of the sounded subpanel based at least in part on a spatial configuration of the sounded subpanel or a spatial correlation between antenna elements.

29. A network entity for wireless communication, comprising:
  a memory; and
  one or more processors, coupled to the memory, configured to:
    receive a sounding reference signal (SRS) at a multi-panel system of the network entity;
    estimate a channel for the multi-panel system using intra-panel sub sampling or inter-panel sub sampling; and
    transmit or receive a communication based at least in part on the estimating the channel.

30. The network entity of claim 29, wherein the one or more processors, to estimate the channel, are configured to estimate the channel using one or more of intra-subpanel subsampling or intra-polarization subsampling.

* * * * *